(12) United States Patent
McFarland

(10) Patent No.: US 7,093,528 B2
(45) Date of Patent: Aug. 22, 2006

(54) SEAL AND VALVE SYSTEMS AND METHODS FOR USE IN EXPANDERS AND COMPRESSORS OF ENERGY CONVERSION SYSTEMS

(76) Inventor: Rory S. McFarland, 1630 30th St., Unit 253, Boulder, CO (US) 80301

( * ) Notice: Subject to any disclaimer, the term of this patent is extended or adjusted under 35 U.S.C. 154(b) by 0 days.

(21) Appl. No.: 10/977,639

(22) Filed: Oct. 29, 2004

(65) Prior Publication Data
US 2005/0056018 A1 Mar. 17, 2005

Related U.S. Application Data

(62) Division of application No. 10/279,361, filed on Oct. 24, 2002, now Pat. No. 6,827,104.

(60) Provisional application No. 60/335,007, filed on Oct. 24, 2001.

(51) Int. Cl.
*F04C 27/00* (2006.01)
(52) U.S. Cl. .................... 92/138; 92/148; 418/138
(58) Field of Classification Search .............. 92/31, 92/32, 33, 138, 147, 148; 418/137, 138, 418/139, 140, 145, 147
See application file for complete search history.

(56) References Cited

U.S. PATENT DOCUMENTS

| | | | |
|---|---|---|---|
| 360,057 A * | 3/1887 | Smith ..................... 92/138 |
| 1,941,651 A * | 1/1934 | Behlmer ................. 418/138 |
| 2,633,082 A * | 3/1953 | McFarland ............... 92/138 |
| 4,041,707 A | 8/1977 | Spector | |
| 4,104,883 A | 8/1978 | Naef | |
| 4,154,055 A | 5/1979 | Pulick et al. | |
| 4,329,842 A | 5/1982 | Hoskinson | |
| 4,420,373 A | 12/1983 | Egosi | |
| 4,610,606 A * | 9/1986 | Hazzard et al. ............. 92/148 |
| 4,672,989 A | 6/1987 | Milburn, Jr. | |
| 4,751,814 A | 6/1988 | Farrell | |
| 5,027,756 A | 7/1991 | Shaffer | |
| 5,114,321 A | 5/1992 | Milburn et al. | |
| 5,143,121 A | 9/1992 | Steinhardt et al. | |
| 5,251,594 A | 10/1993 | Meyer | |
| 5,473,899 A | 12/1995 | Viteri | |
| 5,839,270 A | 11/1998 | Jirnov et al. | |
| 5,899,071 A | 5/1999 | Stone et al. | |
| 5,904,044 A | 5/1999 | White | |
| 5,913,329 A | 6/1999 | Haynes et al. | |
| 5,983,636 A | 11/1999 | Carlqvist et al. | |
| 5,996,355 A | 12/1999 | Jirnov et al. | |
| 6,023,934 A | 2/2000 | Gold | |
| 6,062,023 A | 5/2000 | Kerwin et al. | |

(Continued)

*Primary Examiner*—Edward K. Look
*Assistant Examiner*—Michael Leslie
(74) *Attorney, Agent, or Firm*—Kent A. Lembke; Hogan & Hartson

(57) ABSTRACT

An epicycling device with improved sealing. A housing is provided with adjacent walls spaced apart to allow a substantially planar partition to pass. A piston is linked eccentrically to a drive shaft and positioned within the housing, has a cross sectional shape for mating with the housing walls and includes a circular recessed surface at its corners. Seal housings with a hollow cylindrical cross sectional shape are provided at each corner of the piston housing. An inner seal element is positioned within each of the recessed surfaces with the inner seal element including an elongate cylindrical body with a slot therethrough. An outer seal element is positioned within the seal housings with the outer seal element including an elongate cylindrical body with a slot. A partition is positioned between each pair of the inner and outer seal elements and slidably engaged with the slots in the seal elements.

10 Claims, 15 Drawing Sheets

U.S. PATENT DOCUMENTS

| | | |
|---|---|---|
| 6,085,786 A | 7/2000 | Forsythe |
| 6,161,392 A | 12/2000 | Jirnov et al. |
| 6,195,992 B1 | 3/2001 | Nommensen |
| 6,205,782 B1 | 3/2001 | Kinnersly |
| 6,283,723 B1 | 9/2001 | Milburn et al. |
| 6,347,611 B1 | 2/2002 | Wright |
| 6,390,052 B1 | 5/2002 | McMaster et al. |
| 6,481,988 B1 * | 11/2002 | Valentinovich ............. 418/138 |

* cited by examiner

_US 7,093,528 B2_

SEAL AND VALVE SYSTEMS AND METHODS FOR USE IN EXPANDERS AND COMPRESSORS OF ENERGY CONVERSION SYSTEMS

CROSS-REFERENCE TO RELATED APPLICATIONS

This application is a divisional application of U.S. application Ser. No. 10/279,361, filed Oct. 24, 2002 and issued as U.S. Pat. No. 6,827,104 B2, which claims the benefit of U.S. Provisional Application No. 60/335,007, filed Oct. 24, 2001, both of which are incorporated by reference herein in their entirety.

BACKGROUND OF THE INVENTION

1. Field of the Invention

The present invention relates, in general, to power generation and conversion, to cryogenic systems, and to improvements in heat engines and systems, and more particularly, to energy conversion systems and methods that utilizes a working fluid, such as a biatomic gas, that is recirculated within a high pressure tank that contains a compressor and is exposed to a heat exchange surface to enhance existing heat engine efficiencies and that further utilizes a cold reservoir to capture additional energy from the working fluid.

2. Relevant Background

Modem society has an insatiable and growing thirst for energy and for devices and systems that consume large quantities of energy. Presently, the largest sources of energy are non-renewable including the fossil fuels of coal, oil, and gas. Renewable energy sources are only a small portion of the global energy supply and include wind, solar, and geothermal sources. Energy sources are generally converted by conversion systems using heat engines and other devices into other forms of energy such as thermal energy (or heat) and mechanical energy. It is estimated that in the not too distant future non-renewable energy sources will become depleted or that the costs associated with converting these sources to heat and other useful energy will significantly increase causing many of these sources to be inaccessible to large parts of the population. Hence, there is an ongoing societal need for more efficient methods and systems for converting energy from non-renewable and renewable energy sources into clean, useful energy.

Common energy conversion systems employ heat engines to convert heat energy from renewable or non-renewable energy sources to mechanical energy. The examples of heat engines are numerous including steam engines, steam and gas turbines, spark-ignition and diesel engines, or external combustion and the Stirling engine. Each of these heat engines or systems can be used to provide the motive power or mechanical energy for transportation, for operating machinery, for producing electricity, and for other uses. Heat engines typically operate in a cycle of repeated sequences of heating and pressurizing a working fluid, performing mechanical work, and rejecting unused or waste heat. At the beginning of each cycle, energy in the form of heat and/or pressure is added to the working fluid forcing it to expand under high pressure so that the fluid performs mechanical work. In this manner, the thermal energy contained in the pressurized fluid is converted to kinetic energy. The fluid then loses pressure, and after unused energy in the form of heat is rejected, the fluid is reheated or recompressed to restore it to high pressure.

Unfortunately, existing heat engines do not convert all the input energy to useful mechanical energy in the same cycle as generally some amount often in the form of heat is not available or utilized for the immediate performance of mechanical work. The fraction of thermal energy that is converted to net mechanical work is called the thermal efficiency of the heat engine. The maximum possible efficiency of a heat engine is that of a hypothetical or ideal cycle, called the Carnot Cycle (based on absolute zero as the starting point). Existing heat engines generally operate on much less efficient cycles, such as the Otto, Diesel, Brayton, or Stirling Cycles, with the highest thermal efficiency achieved when the input temperature is as high as possible and the sink temperature is as low as possible. The "waste" or rejected heat is sometimes used for other purposes, including heating a different working fluid, which operates a different heat-engine cycle or simply for space heating but most often the rejected heat is released to the environment. Another common efficiency problem is that when compressors are used to compress incoming air or working fluid and are driven by a shaft driven by the device creating the mechanical power, e.g., a turbine using the Brayton cycle, and the compressor consumes a large portion of the created shaft power, e.g., up to two-thirds of the power.

Other problems often accompanying the use of heat engines is how to achieve proper timing along with appropriate intake and outlet valving and how to achieve adequate sealing of such devices. Standard timing valves with camshafts and common valves are useful for standard piston expanders and compressors but are not as desirable and useful for timing the input of high pressure gases when nutating or eccentric shafts are used in expanders and/or compressors used in heat engines. The concepts of precession and nutation of bodies with energy being transferred from the rotational motion of a nutating body, such as in an internal combustion engine, have been tried, but generally it has proven very difficult to valve such devices and even more difficult to design such nutating and/or eccentric devices for proper sealing of working gases or fluids. Often, these non-standard devices are not adopted because high precision and relatively expensive materials and machining has been required to obtain useful valving and sealing systems for these devices or sealing has simply been done through the use of flat sealing strips.

Hence, there remains a need for improved devices and techniques for converting energy in a working fluid with increased efficiencies. Preferably, such devices and techniques are selected to facilitate the use of non-standard compressors and/or expanders that incorporate nutation, eccentric drives, or epicycling (e.g., the use of an eccentric drive limited to motion in a single plane rather than the "wobbling" of a nutating device) by providing improved inlet and outlet valves and sealing systems.

SUMMARY OF THE INVENTION

The present invention addresses the above problems by providing energy conversion systems and corresponding methods that are adapted to make power and cooling (e.g., cryogenic and coolant flow for refrigeration and heat transfer). The energy conversion systems of the invention generally include an artificially maintained cold reservoir or loop that is retained out of equilibrium with the surrounding environment or ambient fluids (e.g., air, water, and the like). An expander heat engine is included in the system to produce mechanical power from the expansion of a working fluid, such as a binary gas. The expander is thermally and pressure isolated and receives the relatively high-pressure working fluid that has been heated by a heat exchanger to a temperature higher than the thermally isolated expander. Some of the power generated by the expander is, at least in some embodiments, used to perform forced rarefaction of the working fluid and to power a cooling cycle in which condensated working fluid or condensate from the expander and/or rarefaction is pumped to a cold reservoir to export additional heat obtained by the working fluid in the thermally isolated heat exchanger or heat transfer zone. The amount of energy or heat diverted from power production for the purpose of lowering or creating the cold reservoir is preferably at least equal to the friction of the expander section of the heat engine as this energy allows the system to continue operation without reaching equilibrium by eventually running down.

Generally, the engine is selected to be a relatively large volume engine relative to the engines size and/or crank shaft. Typically, the system can be fabricated from common industrial materials and components such as those used for internal combustion engines and bearings. One embodiment of the system uses off-the-shelf components including pumps, engines, and compressors that are built to tolerances and with materials selected to operate within the pressure and temperature ranges of the system, i.e., very cold temperature ranges compared with internal combustion engines. For example, a swash plate piston motor used in hydraulics and air conditioning can be used as an expander, which provides a high ratio of working area to power train linkage and weight. The components are tuned for their designed operating temperatures including calculating any changes for differential shrinkage of rings or bearings, and a lubricant used for cryogenic pumps can be utilized for the expander and related components with beryllium copper and materials chosen for cryogenic systems used in the system of the invention (such as for springs for seals or valves).

After expansion and cooling, a compressor is provided in the system to recompress the now less energetic working gas. The compressor is typically positioned within the same pressure vessel as the expander with a heated or working portion of the compressor exposed to the cold or low temperature side of the heat exchanger to provide the heat of compression to the working fluid rather than rejecting it to the environment. The compressor injects or discharges the compressed working gas to the cold side of the heat exchanger where the gas absorbs heat from an input hot or energy-source fluid such as ambient air, compressed gas (heated or unheated by combustion processes or other heat sources), water or other fluids (e.g., ocean or other large bodies of water), fluids heated by geothermal sources, rejected hot gases and fluids (e.g., from internal combustion engines, manufacturing processes, or any other heat generating process), and the like. According to the invention, a load, e.g., a mechanical load, an electrical load such as a power grid, a device performing work by pumping fluid, or any other useful device or system for performing work, is provided outside the thermal barrier or vessel containing the expander and the compressor, to allow exportation of the power converted within the vessel. In most embodiments, a shaft-driven motor generator device is provided for converting the mechanical energy created by the expander, which is linked to the generator shaft, so that electricity can readily be exported from the thermal barrier. In one embodiment, the amount of energy exported is selected to be about equal to frictional losses in the expander and generally not less than about one third of the total energy produced by the expander. The motor generator device is operated in a motor mode to start the expander (and, generally, the compressor) to start the energy conversion system.

The energy conversion system preferably is operated at a relatively steady speed or rate after it has been started and continues to run as long as a temperature difference is maintained between the input or energy-source fluid and the working fluid on the cold side of the heat exchanger. A controller or regulator is provided to control the ongoing operation of the system by setting the circulation of working fluid, controlling mass flow of the energy-rich fluid in the cold or working side of the heat exchanger, the size of the outside load, the supply of working fluid (e.g., if replenishing of working fluid is required due to condensate collection or other reasons), and valve and/or piston timing. Note, that generally it is more important to provide a useful rate of working gas flow through the system (e.g., through the channel or flow maze created in the system) to cause heat to be transferred as desired and to achieve proper energy or heat flow in the system than to attempt to provide high or absolute insulation of the expander or isolation vessel. A large portion of the heat energy converted to mechanical energy and other forms of useful energy such as electricity is transferred outside of the thermal barrier or low-pressure expander vessel. The remainder of the work is used inside the system to recompress the working gas, to pump condensed working fluid, to maintain the artificial cold reservoir in or associated with the expander heat engine, and to overcome mechanical component or other inefficiencies (such as friction), but, significantly, due to the configuration of the system and the positioning of the components, the remainder of the work or energy is "rejected" within the system rather than to the surrounding environment so that this energy is recirculated and available for conversion again and is not wasted.

More particularly, an epicycling device is provided with improved sealing. The device includes a housing defining a piston chamber having at least three walls with adjacent walls spaced apart to allow a substantially planar partition to pass during operation of the device. A piston element is linked eccentrically to a drive shaft passing through the center of the piston element. The piston element is positioned within the housing, has a cross sectional shape for mating with the housing walls (e.g., triangular for a three-walled housing, square for a four-sided housing, and the like), and includes a generally circular recessed surface at each of its corner with a inward slot for receiving the partition. Seal housings with a hollow cylindrical cross sectional shape are provided at each corner of the piston housing with openings mating with the space between adjacent walls of the piston housing to allow the partition to pass into the seal housings. An inner seal element is positioned within each of the recessed surfaces with the inner seal element including an elongate cylindrical body with a slot therethrough. An outer seal element is positioned within each of the seal housings with the outer seal element including an elongate cylindrical body with a slot. A partition is positioned between each pair of the inner and outer seal elements and slidably engaged with the slots in the seal elements. The seal elements include a ring seal around each end of the elongate cylindrical body. The seal elements include a raised seal element extending parallel to the central axis of the elongate cylindrical body positioned on an outer surface of each of the seal elements.

DETAILED DESCRIPTION OF THE PREFERRED EMBODIMENTS

The present invention is directed generally toward mechanical devices and operating methods for creating temperature and pressure differentials resulting in a number of thermal zones of increasing entropy. These devices and methods allow work to be extracted from an expanding gas and work to be exported as shaft power or electricity from a thermally isolated system or portion of the system while an artificially maintained cold reservoir or loop is created for use in keeping the system operating. The cold reservoir enables a heat engine to utilize or convert energy in an available hot or energy-rich source such as ambient air, heated and compressed gases, heated or ambient fluids such as ocean water, and the like, that is passed through the hot side of a heat exchanger with a working fluid, e.g., a biatomic gas, on the cold side of the exchanger. More specifically, the present invention is directed to an eccentric valving system for use with epicycling or nutating expander and compressor devices and to a sealing system useful with epicycling devices. These systems can be used alone or in combination and are described below with reference to FIGS. 17–21.

The systems described below with reference to FIGS. 1–21 can be fabricated from many existing components, such as expanders, compressors, chillers, valves, heat exchangers, pressure vessels, thermally-insulated vessels, and the like, and as such, the description does not provide detailed explanation of each component as these will be readily understood by those in the power generation and energy conversion arts. Instead, the arrangement of the components relative to each other to create new and unique flow paths for working fluid, to create heat exchange surfaces, to create thermally and pressure isolated chambers, and to provide other useful energy conversion configurations is discussed at great length with reference to figures that show numerous embodiments of energy conversion systems and implementations of energy conversion systems and devices. Specific embodiments of the energy conversion systems and how they may be used are discussed initially and then alternative embodiments and supporting processes and/or underlying theories are provided to support the included claims and to support understanding of the breadth of the invention. In this regard, the energy conversion system is highly efficient in converting low grade energy sources, such as heat (e.g., long wave radiation) found in a gas or fluid, into high grade energy, such as electricity, while also providing a number of by-products including cooling for use in refrigeration or cryogenic processes and processing of the fuel source and/or the working fluid, such as to obtain liquid nitrogen or other normally gaseous elements and compounds or to obtain water or some other portion of the processed source or fluid.

Figure 1:
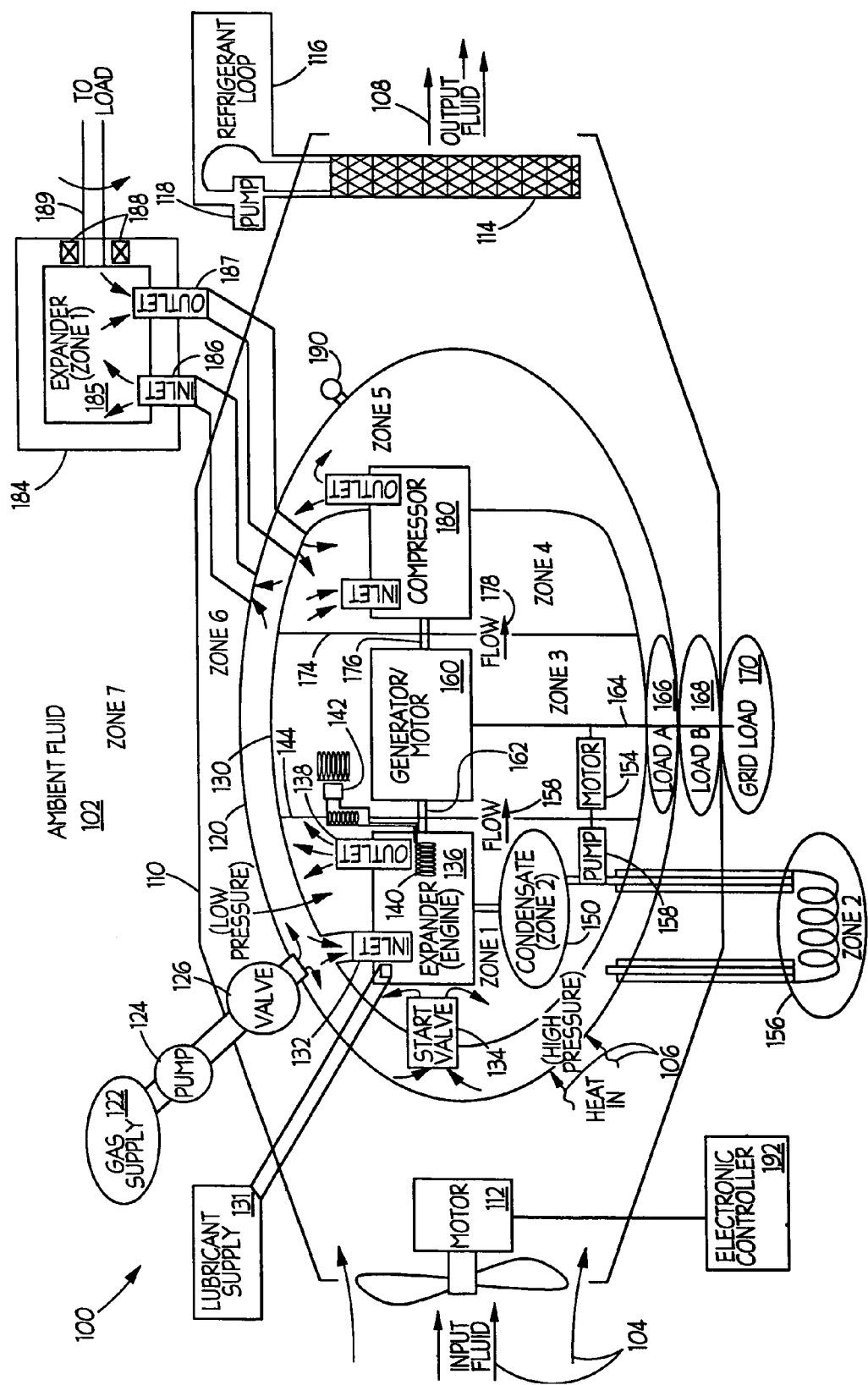
FIG. 1 illustrates in block diagram or schematic form an energy conversion system according to the present invention illustrating the use of a separate expander or heat engine and compressor driven by a single shaft and enclosed within a single pressure vessel.

FIG. 1 illustrates an energy conversion system 100 of the invention with temperature and pressure zones labeled for ease of discussion. As shown, the system 100 is placed within an ambient fluid 102 that provides the energy source for the system, with this energy-rich area, such as the ambient air, ambient fluid such water or other fluid, or a gas absorbing heat (e.g., solar energy from the Sun or a heat releasing process). An outer vessel 110 is provided to define a flow path (i.e., labeled Zone 6) for input fluid 104 through the system 100 on a hot side of a heat exchanger used for transferring heat 106 in the input fluid 104 from the ambient fluid 102 to a working fluid 128 (such as a monatomic gas, biatomic gas, and the like). The heat exchanger is further defined by the high pressure vessel 120 that is typically formed of steel or other pressure resistant material that is configured to contain the working fluid 128 in Zone 5 at a pressure much higher than the pressure of the hot input fluid 104 in Zone 6 and than working fluid 128 within an interior thermal barrier or vessel 130. The high pressure or heat exchanger vessel 120 also acts as the heat transfer surface between the hot fluid 104 and the cold working gas 128 flowing in Zone 5 and as such is selected to provide a relatively high heat transfer rate. In many embodiments, the vessel 120 is configured with fins or other structures and/or devices common for providing a more efficient heat transfer surface (i.e., to increase the size of the heat transfer surface provided by heat exchange or pressure vessel 120) and the path of Zone 6 defined by the vessels 110 and 120 may be circuitous or serpentine to increase the time the input fluid 104 is in contact with the vessel 120 to better transfer the heat 106 to the working gas 128.

The input fluid 104 is drawn into an input port of the outer vessel or tank 110 by a fan and motor (or pump for liquids) 112 and is discharged as output fluid 108 from an outlet port of the vessel 110 after passing over the outer surface of the heat exchanger vessel 120. In some embodiments, an optional refrigerant loop 116 utilizes the now lower temperature output fluid 108 to provide cooling as a byproduct in the system 100, such as by passing the output fluid 108 through a cooler or heat transfer coil 114 through which a hotter refrigerant from the loop 116 is pumped by pump 118.

The energy conversion system 100 includes a gas supply 122 for initially filling or pumping up the vessel 120 with working fluid 128, such as a monatomic gas such as nitrogen, hydrogen, and the like or a biatomic gas such as a combination of nitrogen and helium, a combination of nitrogen and ammonia, and the like, through a pump 124 and a control valve 126. The pump 124 and valve 126 may be operated by an electronic controller 192 to further provide make up working fluid 128 to replenish any fluid 128 lost or intentionally removed (such as by removal of a desirable condensate such as liquid nitrogen) during operations of the system 100. The operation of the controller 192 are further discussed with reference to FIG. 3, but generally, the controller 192 (or controllers) is linked to numerous components of the system 100 to control the flow rates within the heat exchangers hot and cold sides, to control the export of power to an outside load (i.e., grid load 170), and to control the various operations of valves, pumps, and the like in the system 100 to govern system operations and timing.

An important feature of the system 100 is the thermal and pressure isolation of the heat engine and conversion components within an interior thermal barrier vessel or tank 130. Preferably, the vessel 130 is fabricated to provide an insulation layer to limit heat transfer between working fluid 128 in Zone 5, i.e., the cold, high pressure fluid 128 flowing in the chamber defined by the outer surface of the vessel 130 and the inner surface of the vessel 120, and working fluid 128 within the vessel 130. The vessel 130 further is configured with structural strength and seals adequate to maintain the working fluid within the vessel 130 at a much lower pressure than the fluid 128 in Zone 5. As will be explained in more detail with reference to FIG. 2, a start valve 134 can be provided to initially pressurize the interior chambers of the inner vessel 130 (or within Zones 1, 3, and 4) to a desired pressure relative to the pressure within outer vessel 120 (or within Zone 5). Also, a safety valve 190 is provided to prevent over pressurization of the outer vessel 120.

The expander or heat engine 136 is positioned within a first chamber of the inner vessel 130 defined by a thermal partition 144 that maintains the first chamber at a relative lower temperature compared with other portions of the inner vessel 130. The expander 136 can be configured in numerous arrangements that are useful for converting kinetic energy found in a pressurized, heated working fluid 128 into mechanical energy, such as single or multiple piston devices with the expander being linked to a shaft 162 that is rotated during operation of the expander 136. The expander 136 includes an inlet 132 for inputting the high-pressure gas 128 from Zone 5. The gas 128 performs work within the expander 136 and is discharged through outlet 138 and flows 158 through the partition 144 to another chamber, i.e., Zone 3, defined by thermal partitions 144 and 174. As shown, cooling coils 140 linked to the chiller 142 located in Zone 3 or exterior to the expander, are provided as an optional component for better controlling the temperature of the working fluid 128 within the expander 136 to achieve a desired amount of energy conversion.

The expander 136 is further configured to support creation of a cold reservoir or operation of a cold loop that is labeled as Zone 2. To this end, the expander 136 may be configured to perform additional expansion of the working fluid 128 or force rarefaction with further movement of a piston or removal of heat with an auxiliary cooling loop or both. Condensate generated by the expander 136 is collected in tank 150 and, optionally, pumped as a liquid with pump 152 driven by motor 154 that is in turn provided power from generator 160 via line 164. The condensate 150 is pumped in the illustrated system 100 through a cryogenic loop 156 where the working fluid or liquid is heated, such as in manufacturing or other processes utilizing cryogenic liquids (i.e., another byproduct of the system 100), and released as gas into the chamber defined by vessel 120 or into Zone 5.

Figure 14:
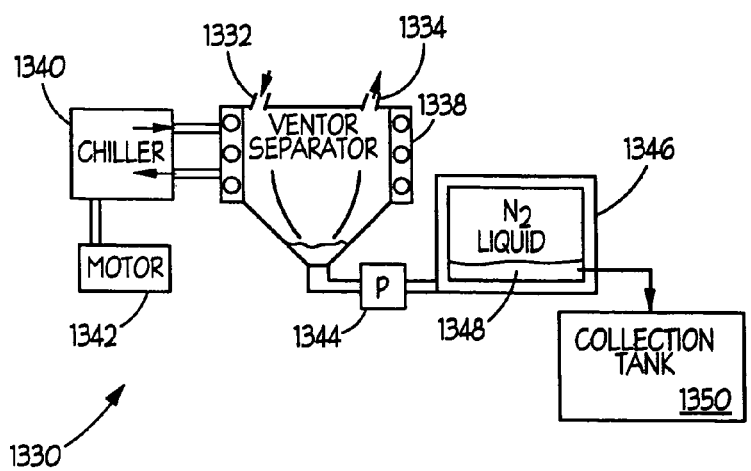
Figure 15:
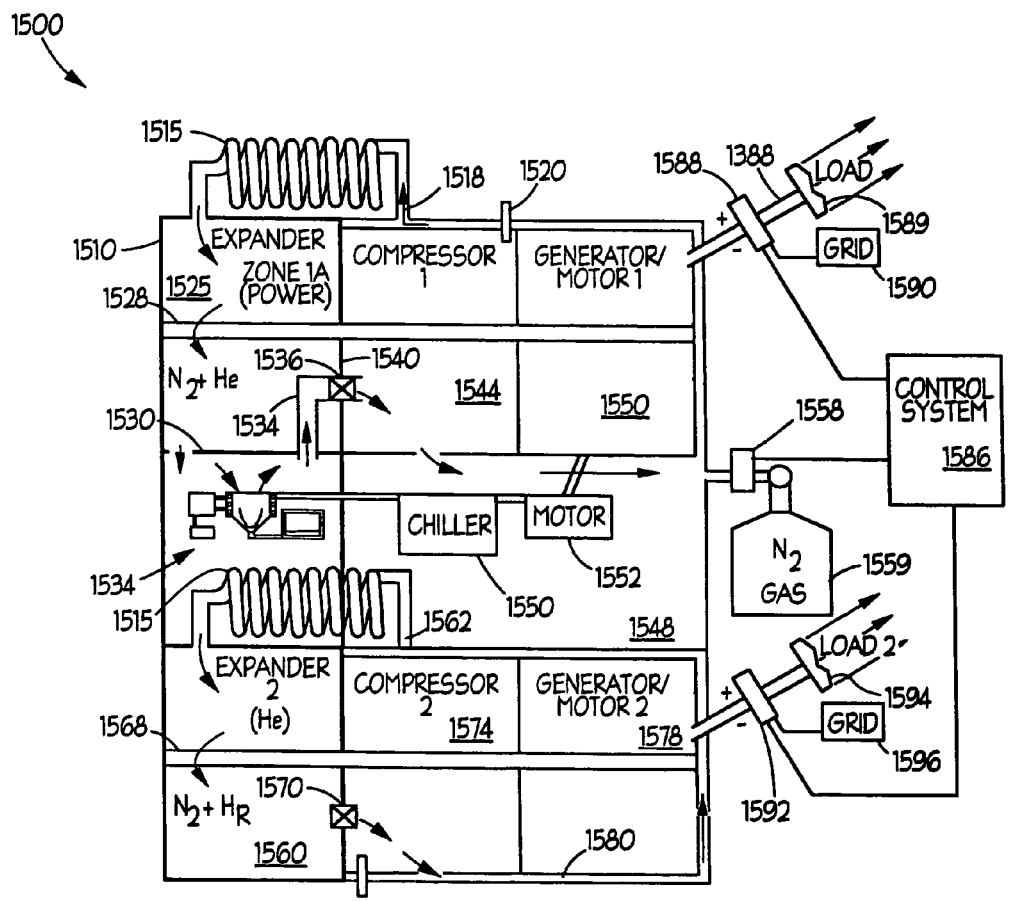
FIG. 15 illustrates an energy conversion system similar to that of FIGS. 13 and 14 including a second or secondary energy conversion device operating with a different or second working fluid at different operating pressures and/or temperatures.

In other words, the working gas 128 is cooled during the expansion (e.g., it transfers energy to the pistons or other devices of the expander 136) that is performed in thermally isolated expander 136 positioned within the thermal and pressure isolation vessel 130. The expanded and cooled gas 128 (at least in some embodiments) undergoes further cooling by use of a portion of the power derived from the expansion cycle (or from electricity created by the generator 160 due to mechanical energy developed in the expander 136) to further cool the working fluid gas 128 to a cryogenic or near cryogenic liquid, which can then be used by the system 100 for cooling other devices or apparatus, such as in loop 156, and allows the system 100 to maintain a lower and more steady bottom temperature for the cold reservoir. The additional cooling of the expanded gas is typically performed on the working gas 128 at the output side of the expansion engine 136 (which, for example, may be expelled through a Venturi chamber with cooling coils as shown in FIGS. 14 and 15 to enhance condensation). The additional cooling can be performed using a number of devices such as those configured according to a "reverse" Brayton cycle, a Rankin cycle, or a Stirling cycle each of which would generally expel heat (see, coils 140 and chiller 142) outside the expansion chamber (i.e., Zone 1) defined by partition 144 within vessel 130 into a warmer area of the circulation path of the working gas 128, such as the motor generator 160 chamber between partitions 144 and 178 (i.e., Zone 3). In this manner, some of the energy produced from the expander 136 is used to further lower the temperature of the working fluid 128 to a point where some of the gas 128 may condense to a liquid for collection in tank 150.

The invention allows for a very wide range of design choices for the engine 136 and the components used for moving the working fluid 128, as long as basic ambient energy conversion principles are utilized. The materials, such as Teflon, for the various components in the system 100 are generally not exotic or expensive, e.g., when nitrogen or nitrogen and helium are used as the working fluid 128, nitrogen gas and liquid handling materials and components are fairly well known and readily available. Cryogenic loop 156 may utilize more exotic materials such as beryllium copper, super insulating paint, and the like. The expander 136 can be a mass produced block such as a two-cycle diesel block, or a relatively simple expanding cylinder of a piston engine (which has excellent thermodynamic efficiencies for transferring to rotating power of a shaft). Also, engine designs such as Wankel engines, epicycling, and/or nutating engine designs can be utilized for the expander 136. For example, several patented designs may be utilized with no or minor modifications including U.S. Pat. No. 6,283,723 to Milburn et al.; U.S. Pat. No. 5,473,899 to Viteri; U.S. Pat. No. 5,114,321 to Milburn et al.; U.S. Pat. No. 6,195,992 to Nommensen; U.S. Pat. No. 4,672,989 to Milburn et al.; U.S. Pat. No. 5,027,756 to Shaffer; U.S. Pat. No. 5,251,594 to Meyer; and U.S. Pat. No. 6,390,052 to McMaster et al., each of which is incorporated by reference herein. The biggest challenge in using some of these engines, such as piston machines using a nutating swash plate (e.g., as provided in many hydraulic motors), is how to provide effective sealing to increase efficiencies as leakage past these devices currently does allow these devices to perform as effectively as standard piston ring devices.

After the expander 136, the working gas flows 158 through a thermal partition 144 into an intermediate chamber or Zone 3 defined by thermal partitions 144 and 174. In Zone 3, a motor/generator set 160 is provided (along with previously discussed chiller 142 and condensate motor 154) to convert the mechanical energy from the expander 136 passed to the set 160 via shaft 162 and/or linkages (not shown) into electricity. The electricity is passed out of the interior vessel 130 and vessels 120, and 110 to a grid load 170 or simply a power grid that may be a closed grid for providing electricity to a specific device or system or to a larger grid such as a public utility power grid. Operation of the system 100 is most effective when the quantity of power transmitted to an external point relative to the interior vessel 130 is closely controlled, i.e., by electronic controller 192 to match the amount of energy being converted by the expander 136 and inefficiencies being overcome within the system 100. In many embodiments, the grid load 170 is replaced or supplemented by other loads such as but not limited to mechanical loads. Additional loads may be placed on the transmission line 164 to output the converted energy from the inner vessel 130 such as a load 166 in the cold loop of the heat exchanger and/or a load 168 in the hot loop of the heat exchanger. Again, these loads 166, 168 may be nearly any type of device that utilizes electrical power. The motor/generator set 160 further is run in the motor mode to drive the shaft 162, 176 to drive the expander 136 and compressor 180 during start up and/or during periods of low power conversion (if applicable) and in the motor mode uses power provided by the grid 170 via line 164 (or another power source such as a battery not shown).

The working gas then flows 178 through thermal barrier or partition 174 into a final chamber or Zone 4 defined by the inner vessel 130 inner surfaces and partition 174. Within this chamber or Zone 4, a compressor 180, e.g., any useful compressor device useful for compressing gases, is provided that is driven by a shaft 176 linked to the motor/generator 160. Typically, the shafts 162, 176 are a single shaft that allows the operation of the expander 136, generator 160, and compressor 180 to be coordinated to facilitate timing control within the system 100. The compressor 180 has an inlet 181 for taking in the cooled and lower pressure working gas 128 and an outlet 182 for discharging the working fluid 128 after compression into the cold side of the heat exchanger or Zone 5 exterior to the inner vessel 130. As shown, the compressor 180 is positioned to have at least a portion (such as the compression portion) of the compressor 180 exposed to the exterior of the inner vessel 130 so as to reject the heat of compression to the cold side of the heat exchanger and to further heat the working fluid 128 rather than rejecting the heat of compression to the ambient fluid 102, thereby increasing the efficiency of the energy conversion of system 100.

A lubricant supply 137 is provided and linked to the expander or engine 136 (and other devices as appropriate) to supply lubricant to the expander. Due to the low temperatures in the expander 136, the lubricant supply 137 may include a device or system for warming the lubricant prior circulated to the expander 136. Additionally, in some embodiments and depending upon the working gases supplied by supply 122, additional gases, aerosols, and/or lubricants may be added to or provided with the working gas 128 to help lubricate the internal components, such as those within the compressor 180 and expander 136. For example, lubrication of the working gas 128 may be useful for lubricating valve faces and seats and pistons that may be fabricated from materials susceptible to friction-induced wear (and heat generation) and other wear including hydrocarbon materials, graphite particle materials, Teflon, and the like selected based on working temperature ranges of the components in system 100. Devices and processes typically would then be provided for recovering and processing or cleaning any such additives or lubricants.

Also shown in FIG. 1 is an optional external energy conversion device with a thermal barrier or vessel 184 enclosing a second expander 185. This expander 185 also has an inlet 186 linked to the cold side of the heat exchanger or Zone 5. The working fluid 128 performs work within the expander 185 that is exported from the second conversion device to a load (such as a mechanical load) attached to shaft 189 (with seals 188 provided for sealing thermal barrier 184). Instead of discharging to the cold side of the heat exchanger in vessel 120, the second expander 185 includes an outlet 187 that discharges the working fluid into Zone 4 (i.e., the chamber defined by partition 174 and inner vessel 130) such that the expanded gas is recompressed by compressor 180. Of course, the location of the second conversion device may vary to practice the invention with it being useful in some embodiments to have the inlet 186 for drawing working fluid 128 distal to the outlet 182 of the compressor 180 so as to allow additional heat exchange within the vessel 120 in Zone 5.

Figure 2:
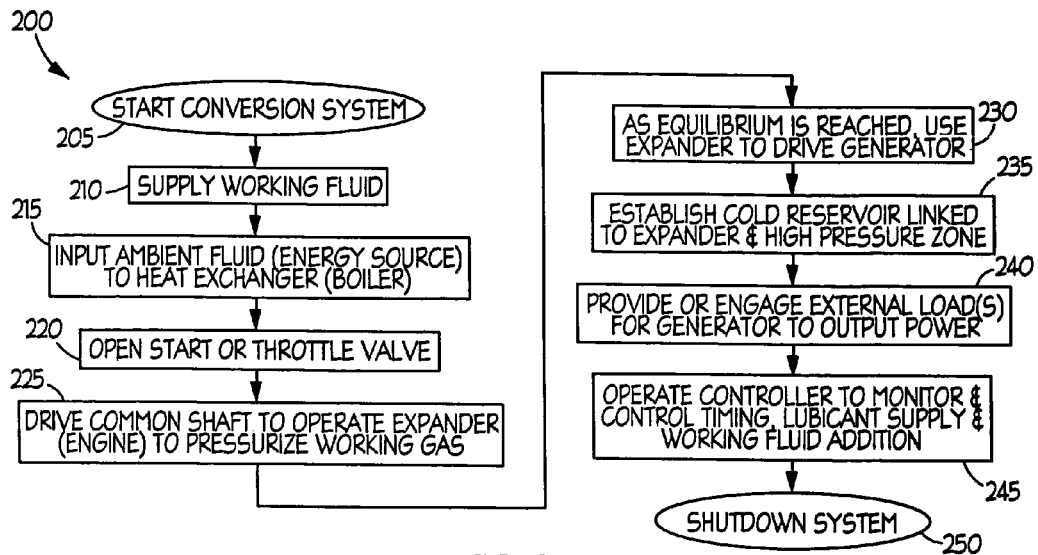
FIG. 2 is a flow diagram of a generalized method of operating the system of FIG. 1.

FIG. 2 illustrates an energy conversion process 200 provided by the operation of an energy conversion system or devices of the present invention, such as the system 100 of FIG. 1. Generally, it should be understood that when the operative cycle 200 starts, it is exothermic from compression of working fluid and then it becomes endothermic as it transitions from motor mode (inputting energy to cool the device) to generator mode or begin using the expanding cryogen. At 205, the conversion process is started typically by constructing a conversion device or system such as system 100 including providing at least an expander 136, a generator 160, and a compressor 180 on a single or multiple drive shafts or otherwise mechanically linked and then placing at least the expander 136 within a vessel 130 that is insulated to thermally isolate the expander from the cold side of the heat exchanger and that is a pressure vessel such that the expander 136 can operate at a much lower pressure than the cold side of the heat exchanger. The energy conversion device (e.g., the components within vessel 120) are then positioned relatively near an energy source, such as the ambient fluid 102 which may be ambient air or gases found on a planet other than air, may be the exhaust gases or fluids of a process, and/or may be a liquid such as that found in an ocean, a sea, a lake, or other body of water that has absorbed solar energy. A method or device for causing the hot fluid 104 to contact the external surfaces of the shell 120 is then provided to allow heat transfer to the inside of the vessel or shell 120 defining the cold loop of the heat exchanger for the system 100.

At 210, the high pressure zone (Zone 5) or cold side of the heat exchanger is pumped up or pressurized to a desired high pressure by pumping a working gas into the non-insulated vessel 120, such as with pump 124 through valve 126. At 215, the energy source or hot side fluid 104 is input to the heat exchanger and forced or allowed to pass through the hot side loop defined by the exterior vessel or tank 110 and the exterior surfaces of the vessel 120 (which, again, may be configured to enhance heat transfer rates to the vessel 120). At 220, a start or throttle valve 134 connecting the cold side of the heat exchanger defined by vessel 120 to the low pressure interior of thermal and pressure isolation vessel 130 (i.e., to Zone 1 containing expander 136) is opened to allow a desired amount of working gas 128 to enter the vessel 130 and to establish the interior pressure (the low pressure set point) of the system 100. The interior pressure is set to establish a desired pressure ratio between the cold loop and the interior chamber holding the expander 136. Typically, the start valve 134 will provide a relatively small orifice in the vessel 130 such as a pinhole because the amount of working fluid 128 added initially to the vessel 130 is generally relatively small.

At 225, the conversion cycle is then started by adding energy to the system 100 such as by driving the common shaft 162, 176 by operating the motor/generator set 160 in motor mode via grid 170 to drive the expander 136 and compressor 180, which works to intake working fluid 132 into the expander 136 and to compress and discharge working fluid via the compressor outlet 182 with the compressor 180. Additionally or as an alternative starting technique, liquefied or compressed working fluid 128 can be added by an external source (not shown in FIG. 1 or the pump 124) to add energy to the cold zone (Zone 5), and in this case, the motor/generator 160 may be placed in the generator mode or initially in the motor mode. As the motor runs, the pressures within vessel 120 (i.e., Zone 5) and within vessel 130 (i.e., Zone 2) will begin to further differentiate and, significantly, the temperatures in these to vessels (i.e., in Zone 5 and Zone 2) will also become differentiated with the temperature in the cold loop defined by vessel 120 being much higher than the temperature of gas 128 in the interior of vessel 130 (i.e., in Zone 2). Note, that motor/generator set 160 is performing work within the vessel 130 and is also expelling heat to the working fluid flowing 158 and 178 through the chamber defined by thermal partitions 144 and 174, which controls heat losses and recirculates the input energy. Also, the compressor 180 is generating heat as it, compresses the working gas 128 and discharges this heat into Zone 4 and mostly into the cold loop of the heat exchanger or Zone 5 to heat the working fluid 128 with energy input via the grid 170 and motor/generator 160.

As 230, equilibrium is being reached within the system 100 and the motor/generator 160 is switched over to generator mode and electricity is exported from the vessel 130 to grid load 170. Equilibrium is reached when the temperature differential of the working gas 128 within the vessel 120 and the input ambient fluid 104 is large enough (combined with required mass flow rates of the two working fluids) to cause the now hot pressurized working gas 128 to drive the expander, attached shaft 162, and motor/generator 160. At 235, the energy conversion process 200 is augmented by establishing a cold reservoir within the system 100 (a Zone 2 shown by condensate tank 150, pump 152, and cryogenic loop 156). The establishment of the cold reservoir at 235 can be assisted by the use of a chiller 142 (such as a Rankin cycle chiller) with a cooling loop 140 within the expander 136 and that is often powered with an outside source such as grid 170 (at least until power is being generated by the expander 136 without assistance from motor 160). Hence, the cold reservoir or Zone 2 is established at 235 within the system 100 by using energy from a battery (not shown) or an external source such as grid 170, which reduces the efficiency of the system 100, and, hence, the system 100 is more adapted for infrequent starting followed by relatively long periods of continuous operation at a relatively steady speed or rate. Additionally, it is preferable that internal efficiencies be maintained relatively low to allow the cold reservoir of Zone 2 to be maintained otherwise in some embodiments the system 100 may not be able to overcome internal efficiencies and will run down or have to be run in motor mode on a more ongoing basis.

At 240, the external load 170 and/or loads 166, 168 are engaged via line 164 and generator 160 to export energy created by the system 100 from the conversion of low grade energy to high grade energy to a point outside the system 100 or at least outside the inner vessel 130. At 245, the electronic controller 192 is operated to monitor the operation of the system 100, to control valve and other operation timing, to control lubrication, working gas supply, hot fluid supply, and the like. In general, the system 100 is best suited for relatively steady operations at a speed or timing set to suit the configuration of the energy conversion devices (such as heat exchanger defined by vessels 110, 120, and 130, expander 136, generator/motor 160, compressor 180, and the cold reservoir), the choice of working fluid 128, the selection of operating pressures and temperatures (i.e., selected temperature and pressure ratios), and the supplied ambient or hot fluid 104 (i.e., mass flow rate of this fluid, the temperature of this fluid, and other heat transfer parameters). At 250, the system 100 is shutdown to end the energy conversion process, such as for maintenance or for moving the system 100 to another location.

As can be seen by this energy conversion process 200, a flywheel effect is created by the conservation of momentum of mechanical components that allows the piston or pistons in the expansion chamber 136 to expand past a point where the expanding gas is performing useful work on the output shaft 162. This "stored" rotational energy is used to further cool and/or liquefy the working gas through "force rarefaction" to create a controlled bottom temperature to the thermodynamic cycle occurring within the system 100. The extra work performed within the system 100 creates heat through friction at other points in the system 100 that is scavenged and/or expelled from shell 120 by the chilled working fluid (e.g., by the heat exchanger). A later part of the cycle in the system 100 and described generally for process 200 some of this heat is converted to mechanical shaft power in the expansion chamber(s) of expander 136 and then to electricity and exported from the device within vessel 130 to do work outside the vessel 130, thereby maintaining the cold bottom temperature of the cold reservoir of Zone 2.

Figure 3:
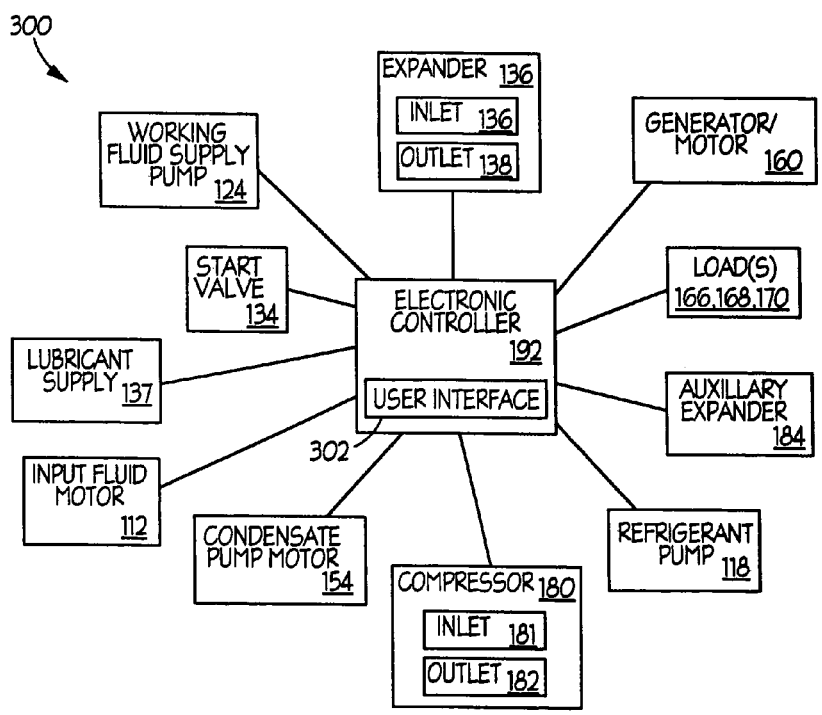
FIG. 3 is a schematic of a control system illustrating use of an electronic controller to control manually or automatically various components of the system of FIG. 1.

FIG. 3 is provided to illustrate at least one connection system for a control system 300 (e.g., to illustrate how electronic controller 192 may be connected within system 100 of FIG. 3). As shown, the control system 300 includes the electronic controller 192 which typically would include a CPU, memory, and other electronic and computer devices common with electronic controllers or regulators, and also includes a user interface 302 for allowing a system 100 operator to start and stop the system 100 as well as input or set operating parameters. The electronic controller 192 is linked to the numerous components of an energy conversion system to monitor and/or control the operation of the component typically automatically based on set points or operating points in memory or electronically set within the controller 192. As shown, the electronic controller 192 is linked to the input fluid motor 112, the condensate motor pump 154, the compressor 180 (to control operation of the inlet 181 and outlet 182 in some embodiments), the optional refrigerant pump 118, the optional auxiliary expander 184, the loads 166, 168, 170 (e.g., to control the amount of energy transferred to each load), the motor/generator 160, the expander 136 (to control operation of the inlet 132 and outlet 138 valves), the working gas supply pump 124, the start valve 134, and the lubricant supply 137.

Of course, the electronic controller 192 can be implemented using multiple controllers with the important concept being that a control system 300 can be provided readily to the system 100 to monitor and control operation and maintain the system 100 in relatively steady operations even in periods of varying input fluid temperatures and/or pressures or varying output power to loads 166, 168, 170 or the variance of other operating parameters. For example, the controller 192 can be used to control the volume and speed of the expander 136 and the volume and speed of the gas pumped in the compressor 180, e.g., by controlling variable eccentrics, variable valves or devices, and the like that can be operated to change the compression and expansion ratio or by controlling differential speed. These controls generally adjust the value of the compression ratio related to their displacement volumes (i.e., compression or pressure ratio is equal to the volume of the compressor over time divided by the volume of the expander over time).

Figure 4:
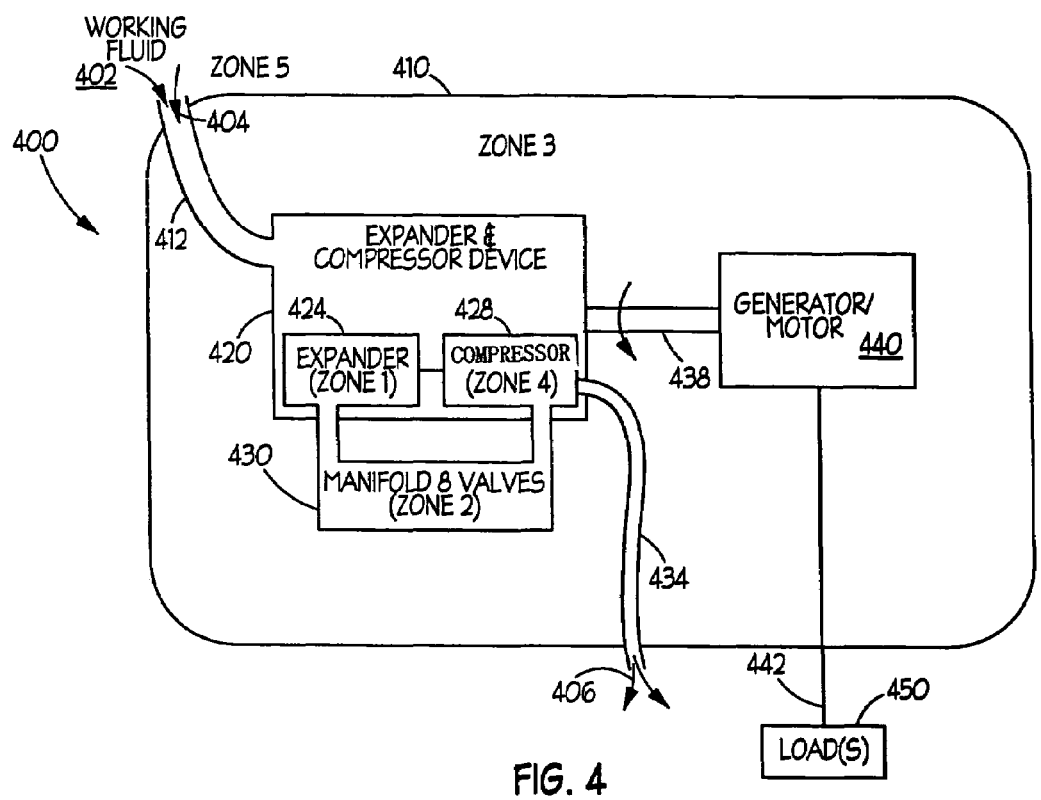
FIG. 4 illustrates a portion of another energy conversion system similar to the system of FIG. 1 except for the integration of the expander and the compressor into a single device.

FIG. 4 illustrates another energy conversion system 400 according to the invention with outer vessels defining Zones 6 and 7 not shown for simplification (but not as a limitation). In the system 400, the expansion and compression functions are integrated for performance within a single device, such as a multiple chamber or piston device. As shown, a thermal and pressure isolation tank or vessel 410 is provided to define a heat transfer surface with a working fluid 402 in a cold loop of a heat exchanger in system 400 (similar to the Zone 5 of FIG. 1). The interior low pressure, low temperature chamber is a single chamber in which an expander and compressor device 420 and a generator/motor 440 are positioned. Hot and pressurized working fluid 402 is taken at 404 in intake line 412 into the integrated device 420 to perform work in an expander 424 (e.g., Zone 1) and is then discharged into piping or manifold and valves 21. 430 (e.g., Zone 2), with rarefaction being performed in the expander 424 in some embodiments. The cold, low pressure working gas is then passed to the compressor 428 (e.g., Zone 4) where it is compressed (and increases in temperature). The compressed working gas 406 is discharged through outlet line 434 to the working fluid 402 in Zone 5 exterior to the vessel 410. The expander 424 drives the shaft 438 (and operates compressor 428) to cause the generator/motor 440 operating in generator mode to generate electricity that is exported from the vessel 410 via line 442 to load(s) 450 for storage or performance of useful work. In an alternative arrangement of the device 420 (not shown), the expander 424 and compressor 428 are combined so as to use a single cylinder with work being performed by the expansion of the working gas in one stroke along with rarefaction and compression being performed in the second stroke of a piston linked to the generator 440 by shaft 438 or other linkage.

Figure 5:
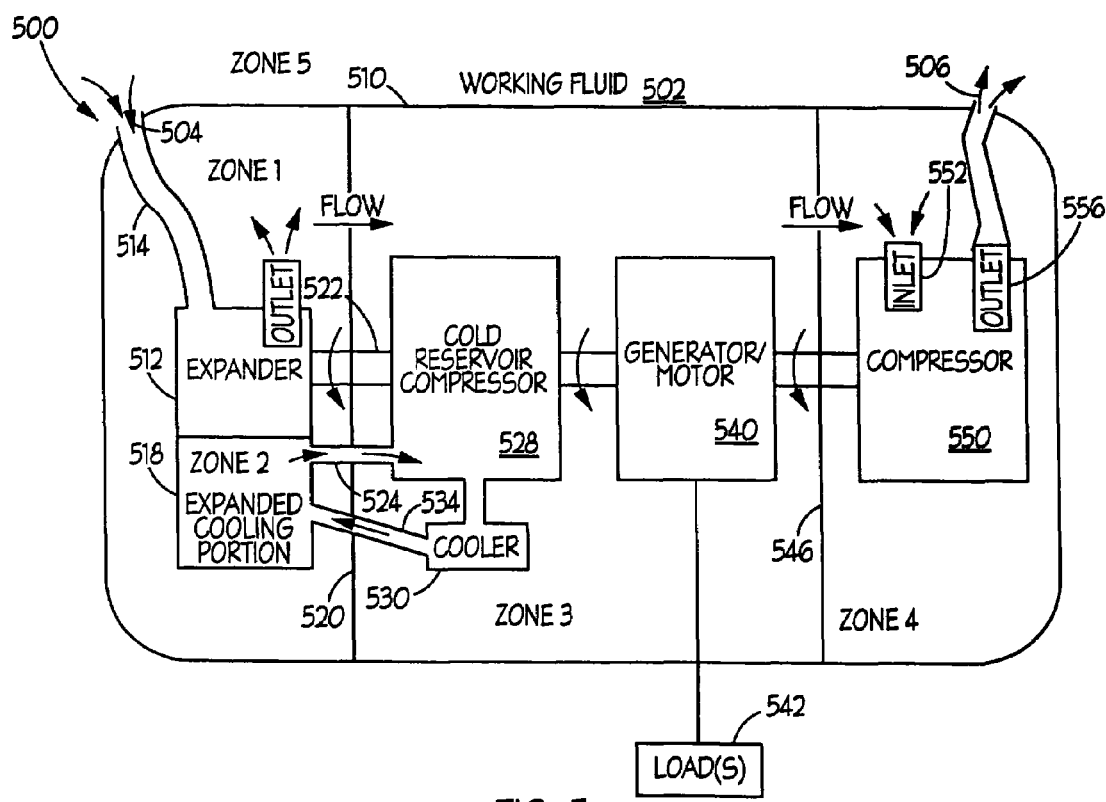
FIG. 5 is a schematic of another energy conversion system with components similar to the system of FIG. 1 but using a shaft driven compressor to create a cold reservoir rather than rarefying or with the expansion device or expander.

Referring to FIG. 5, an energy conversion device 500 is illustrated with another useful arrangement of the heat engine and components for creating and maintaining a cold reservoir. The device 500 uses a shaft driven compressor 528 to create a cold reservoir instead of a piston performing rarefaction. As shown, a working fluid 502 is circulated outside a thermal, pressure isolation wall 510, e.g., in Zone 5. Working fluid 504 that has been heated in Zone 5 is drawn by expander 512 into inlet 514 into a Zone 1 chamber defined by thermal partition 520 and interior surface of wall 510. The working fluid 504 performs work on the expander (such as on a piston or a turbine or vane blade) 512 causing the linked shaft 522 to rotate. The expanded gas is discharged from outlet 516 to flow through thermal partition 520.

An extended or expanded cooling portion 518 (i.e., Zone 2) is provided in the expander 512 to create a cold reservoir within the system 500. As shown, the shaft 522 operates the cold reservoir compressor 528 in Zone 3 (as defined by thermal partitions 520, 546 and interior surfaces of wall or vessel 510) to draw some working fluid 524 from the expander 512 into a compressor 528 and also through cooler 530 where the fluid is rarefied with the cooling provided by a Rankin cycle and liquid or near liquid fluid 534 is returned to the expanded cooling portion or cold reservoir 518 of the expander 512. The shaft 522 also operates the generator/motor 540 positioned in a Zone 3 chamber to generate electricity from the mechanical energy provided by the working fluid 504 input to the expander, and the electricity is transmitted outside the vessel 510 to the load(s) 542. The shaft 522 further operates the compressor 550 which is positioned in a Zone 4 chamber defined by thermal partition 546 and walls of vessel 510 to draw in fluid through inlet 552, to compress the working fluid, and output compressed fluid 506 into Zone 5 (the cold loop of a heat exchanger via output 556. Note, in this embodiment, the compressor 550 is wholly enclosed within the thermal, pressure vessel 510 and rejects heat within Zone 4.

Figure 6:
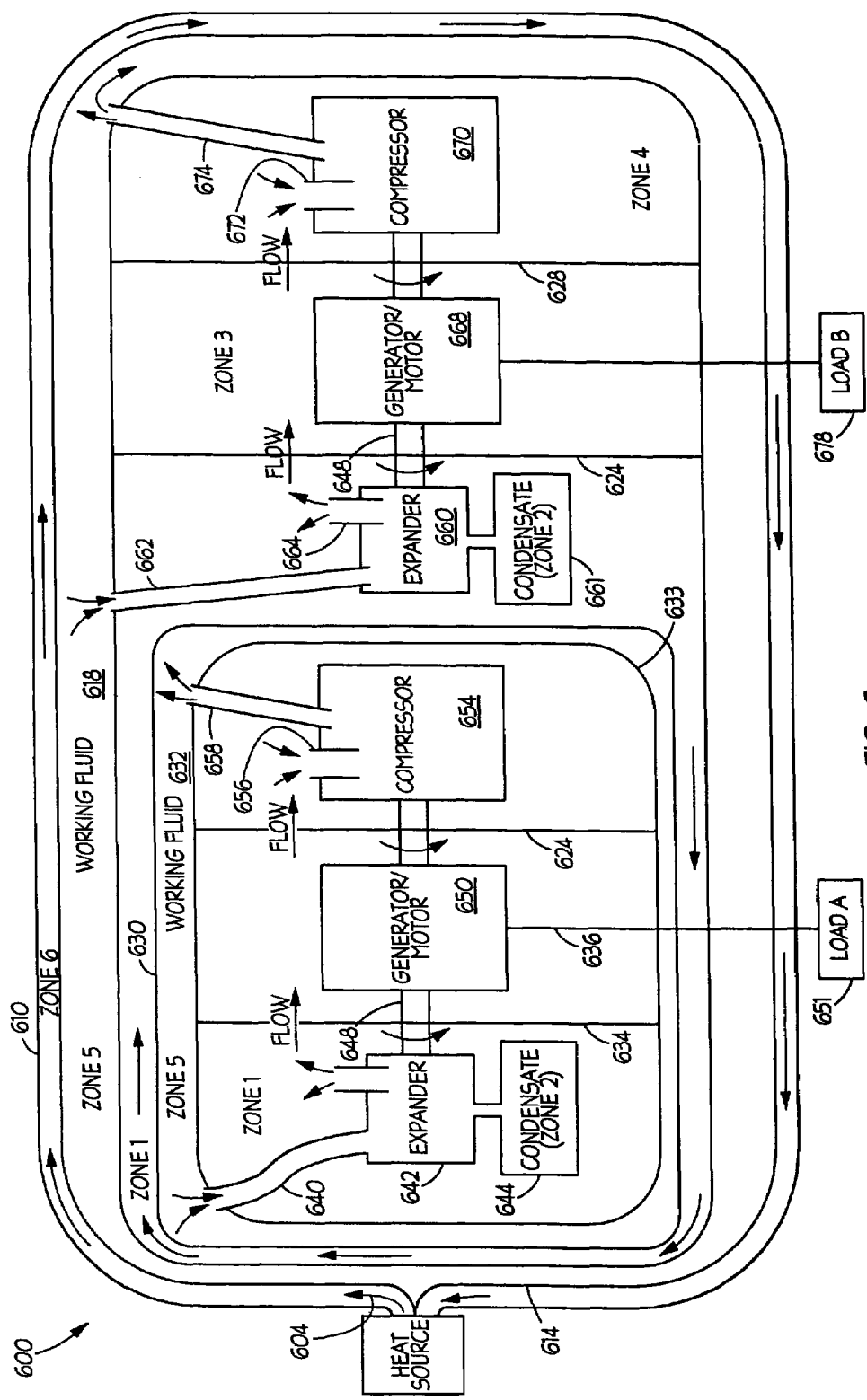
FIG. 6 is a schematic illustration of yet another energy conversion system using heated fluid from a heat source (such as a cooling or exhaust loop of an internal combustion engine) as an input energy source or the hot fluid in the heat exchanger and also providing a second or secondary energy conversion system within the low pressure zone of a first or primary energy conversion system.

FIG. 6 illustrates an embodiment of an energy conversion device 600 that instead of ambient air or an ambient fuel source converts the heat found in a liquid or gas discharged from or heated by a heat source 602. The heat source 602 provides a hot fluid 604 into a hot side of a heat exchanger defined by the channel between tube, shell, or vessel wall 610 and the outer surface of the heat exchanger vessel 614. As shown, the hot fluid 604 is passed in a loop about the vessel 614 and to further increase the heat exchange surface area the Zone 6 channel can be more serpentine and the outer surface 614 may include fins or other structures that increase mating surface area. The heat source 602 may be any of a number of heat sources, such as an internal combustion engine with the working fluid 604 being coolant from the IC engine. Similarly, the heat source 602 can be other types of engines, manufacturing processes, geothermal heat sources, solar panels or devices, and the like. The energy-rich fluid 604 can be a gas or a liquid (or a mixture) with nearly any chemical make up selected to support operation of the heat source in some cases and selected to enhance heat transfer in other cases (i.e., be selected to be a liquid rather than a gas).

The system 600 also utilizes two energy conversion devices or systems rather than a single heat engine or conversion device. As shown, the cold side of the heat exchanger or Zone 5 is defined by the chamber or volume between the inner wall of vessel 614 and the outer wall or surface of thermal, pressure isolation vessel or tank 620. In Zone 5, a working fluid, such as a biatomic gas, 618 flows and absorbs heat from the vessel or wall 614. The isolation vessel 620 is divided into three chambers by thermal barriers 624 and 628. In the first chamber or Zone 1, a primary expander 660 draws in the working gas 618 via intake 662 and discharges the expanded gas via outlet 664 into the Zone 1 chamber. A primary cold reservoir or Zone 2 as shown by condensate tank 661 is linked to the expander 660 and may be created by any of the techniques discussed in the description such as rarefaction by a piston with or without the use of a chiller. The primary expander 660 drives the shaft 666 that in turn drives motor/generator 668 in the Zone 3 chamber to create electricity that is exported to an external load 678. The shaft 666 rotation also operates the compressor 670 in the Zone 4 chamber to intake the working gas via inlet 672, compress the gas, and discharge the compressed working gas via the outlet 674 into the cold side of the heat exchanger defined by shell 614.

A secondary energy conversion device is positioned within the Zone 1 chamber to further absorb heat from the working fluid or gas discharged from the primary expander 660. To this end, the secondary device includes a heat transfer shell or vessel 630 defining a cold side loop for working fluid 632 to flow and absorb heat from shell 630 (and fluid in Zone 1). The heated working fluid 632 is brought into a pressure, thermal isolation tank 633 by secondary expander 642 via inlet 640. The tank 633 is separated also into a Zone 1 chamber, a Zone 3 chamber, and a Zone 4 chamber as defined by thermal partitions 634 and 636. A cold reservoir or Zone 2 is provided and condensate from the expander 642 is collected in tank 644. The expander 642 drives shaft 648 to operate the generator/motor set 650 in generator mode to create electricity that is exported outside the isolation tank 633 to a load 651. The shaft 648 further operates the compressor 654 that intakes working fluid via inlet 656 and outputs compressed working fluid via outlet 658 to the cold loop of a heat exchanger defined by outer vessel 630. The system 600 illustrates that two (or more) devices can be nested or otherwise utilized in combination to provide multiple stages. The working fluids in each device may vary with preferred embodiments employing one or more binary gases and in preferred embodiments, the gases for each energy conversion device are selected to suit the temperature ranges seen by that device (which, generally, will vary for each device or stage within a multiple device system such as system 600).

Figure 7:
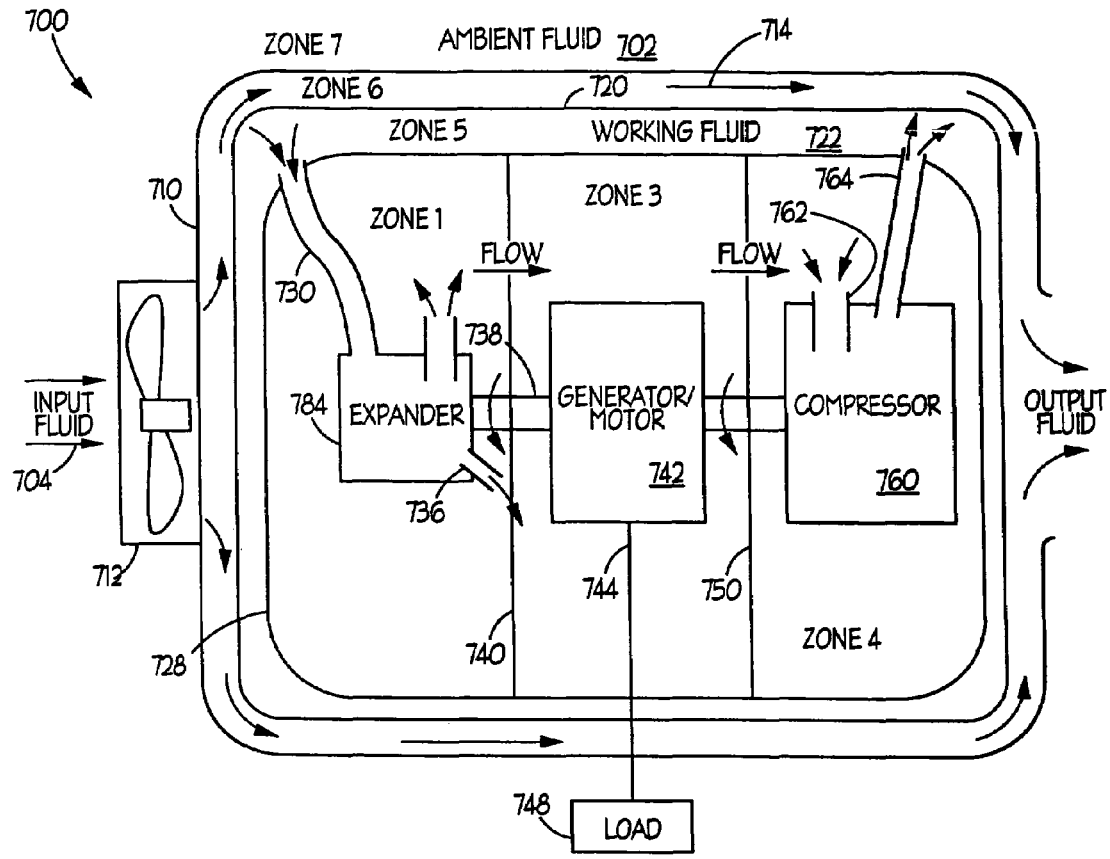
FIG. 7 illustrates an embodiment of an energy conversion system of the invention that is simplified by excluding several components including condensate collection components or cold reservoir system components.

Importantly, the energy conversion features of the invention do not have to be in complicated systems and can be utilized in relatively simple devices such as the energy conversion device 700 shown in FIG. 7. As shown, an ambient fluid or energy-rich gas or liquid 702 flows in a Zone 7 surrounding the external shell 710. A fan (or pump) 712 is provided to draw input fluid 704 into a hot side of a heat exchanger defined by shell 710 and heat exchanger walls or shell 720 and the hot side fluid is shown by arrow 714. The heat exchanger shell 720 encloses a working fluid 722 in Zone 5 or cold side or loop of the heat exchanger of system 700. An pressure, thermal isolation vessel 728 is positioned within the shell 720 to enclose three low pressure chambers, i.e., Zone 1, Zone 3, and Zone 4, defined by the shell 728 and thermal partitions 740 and 750.

The device 700 is simplified by not including a several components shown in the system 100 of FIG. 1 and specifically by not providing a cold reservoir or Zone 2. As shown, an expander or heat engine 734 in the Zone 1 chamber draws in the working fluid 722 via intake 730, the working fluid 722 expands and does work on the expander that is used to rotate the shaft (or other mechanical linkages) 738. The shaft 738 runs the generator/motor 742 in the Zone 3 chamber to generate electricity that is exported to load 748 and runs compressor 760 in Zone 4 chamber that acts to draw in fluid in intake 762, compress the fluid, and discharge the compressed working gas 722 via outlet 764 into Zone 5 defined by shell 720.

Figure 8:
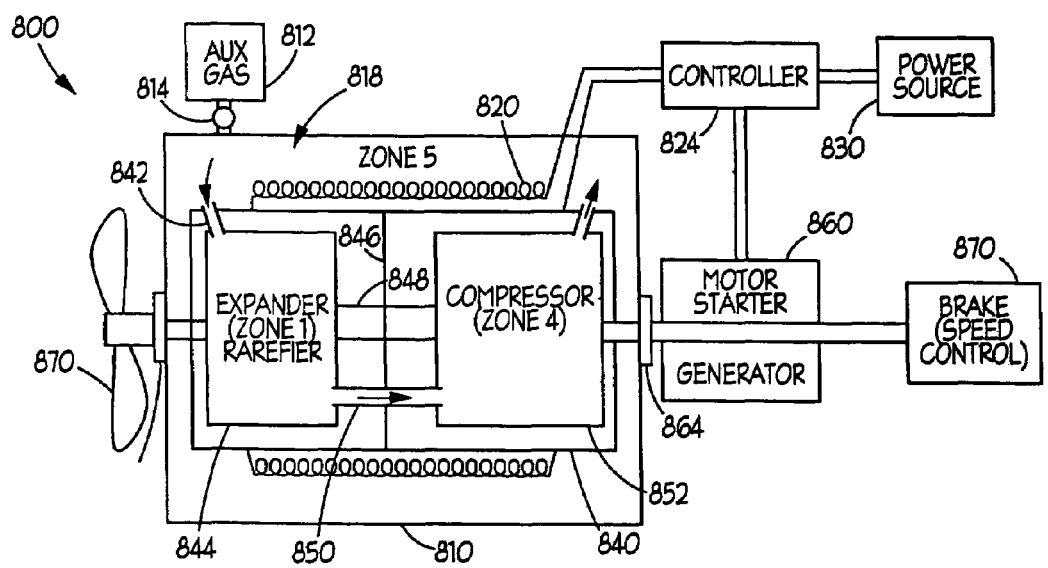
FIG. 8 shows another embodiment of an energy conversion system of the invention arranged with an expander and a compressor within a different shell or vessel than a motor and generator device and providing for heating of the working fluid from an external power source and/or from the motor and generator device.

In some cases, it is useful to utilize provide additional heating in the Zone 5 chamber or the Zone 6 chamber to increase the effectiveness of energy conversion systems, to start the systems or devices, and/or to operate during periods of low ambient temperature. One such embodiment is shown in FIG. 8 in which an energy conversion system 800 is shown that includes a heat transfer casing 810 that defines a cold loop 818 for the working gas in Zone 5. Heat can be transferred from an ambient or energy-rich fluid flowing against the external surfaces of the casing 810 (such as in a Zone 6 depicted in earlier figures) but periodically or continuously a controller 824 is used to regulate passing electricity from power source 830 through resistance heaters or coils 820 in cold loop 818. The controller 824 may be linked operationally to the motor starter/generator device 860 to allow power for the heater coils 820 to be alternatively provided by the generator 860. A brake or other speed control/load 870 is mounted on or connected to the shaft running the motor/generator set 860 to regulate the operating speed of the device 800. Also, work provided by the shaft 848 is exported from the thermal, pressure isolation vessel 840 by providing a load 870 (shown as a propeller as an example useful for watercraft but not as a limitation as any other useful load could be utilized to use the exported work).

The motor/generator 860 is connected to the single shaft 848 but is located outside the isolation vessel 840 and heat exchanger casing 810 with clutch and shaft seals 864, 874 provided to engage the motor/generator 860 and the load 870. As rotating seals typically will leak, an auxiliary gas supply 812 with a pump/regulator 814 are provided to inject makeup working gas into the cold loop 818 within casing 810 as needed to account for gas losses. The expander with a rarefier 844 is placed within the isolation vessel 840 and draws in working gas from the cold loop 818 via inlet 842 and outputs expanded and rarefied gas via connection line 850 to compressor 852 in a separate chamber separated by thermal barrier 846 provided to keep the expander 844 at a desired lower temperature relative to the higher temperature and higher pressure cold loop 818 by isolating the heat of compression. The compressor 852 acts to compress the working gas and discharges the gas via the outlet 856 into the cold loop 818 for recirculation and heating by the coil 820 and casing 810. Note, instead of the coil 820 another source of heat could be provided such as combustion of a fuel source, a heating loop containing a hot liquid or gas, and the like. Also, the coil 820 could be placed external to the casing 810 (such as in heat transfer contact with the outer surface of the casing 810) as could be the external combustion device or other heat source in which external power is provided from a power or fuel source 830.

Figure 9:
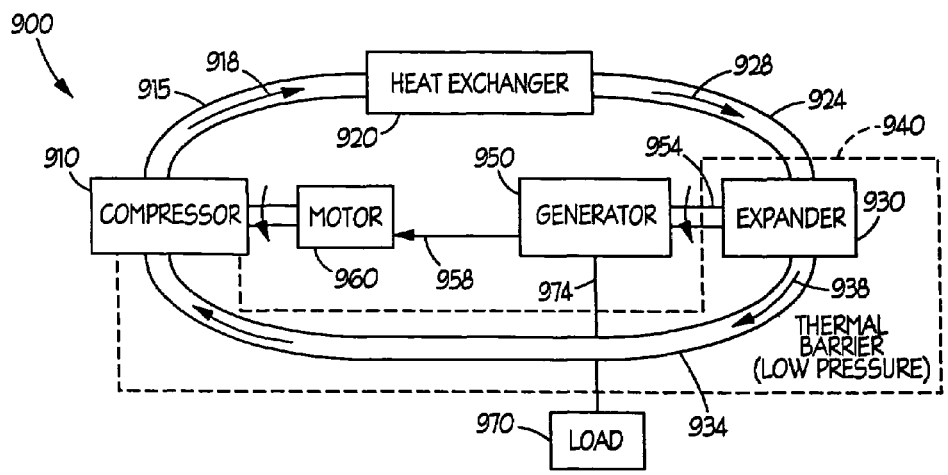
FIG. 9 is yet another embodiment of an energy conversion system according to the invention that includes a compressor operated by a motor and a separate expander driving a generator.

FIG. 9 provides yet another arrangement for the components within an energy conversion system 900 to practice the invention. As shown for the system 900, the expander 930 is again placed within a thermal (and pressure) barrier 940, such as an insulated pressure vessel and the like but the compressor 910 is not placed within this barrier 940 and also is not driven by the shaft 954 attached and driven by the expander or heat engine 930. The compressor 910 compresses and discharges working fluid 918 into a compressor output manifold 915 that guides the working fluid into the cold side of a heat exchanger 920. The heat exchanger 920 may take one of the forms shown in the earlier figures or any of a number of other more common arrangements useful and well known in the field of heat transfer, energy generation, or heating and refrigeration. After absorbing heat in the heat exchanger 920, the working fluid 928 exits the heat exchanger 920 and is directed to the inlet of the expander 930 through an expander inlet manifold 924.

The expander 930 converts work performed by the working fluid in expansion to mechanical energy to rotate the shaft (or other mechanical linkages) 954 to drive the generator 950. The generator 950 generates electricity that is exported to the load 970 and in some embodiments, a portion of the power is transmitted via line 958 to the separate compressor motor 960. The compressor motor 960 rotates compressor drive shaft 964 to run the compressor 910 (or otherwise runs the compressor 910 if a drive shaft is not used to drive the compressor 910). The expanded and chilled working fluid 938 is discharged from the expander 930 to the compressor via an expander/compressor manifold 934 that is placed within the thermal barrier 940.

Due to the unique ability of energy conversion systems and devices of the present invention to recapture heat and recirculate wasted heat from heated fluids, the energy conversion devices and systems can readily be incorporated within buildings and manufacturing facilities to capture heat released from processes occurring within those buildings and facilities and then provide power for use in the processes, for use in the building or facility, and/or for exportation from the building. This concept is illustrated generally in FIG. 10 which shows a structure or dome energy system 1000 according to the invention that utilizes dome structures to better collect and capture heat from processes although the heat from the processes could, of course, be captured in other fashions and provided to the energy conversion systems shown in other manners, such as directly or indirectly on the hot side of a heat exchanger. Importantly, the concept is not limited to a size (as the structure may be a building or a very small device for use in devices such as computers), to a scale, or to a specific shape (e.g., a dome, a cone, a square, a rectangle, and any other useful shape). As illustrated the hot side of the "heat exchanger" or Zone 6 is instead the interior space 1030 defined by the dome 1020.

The dome energy system 1000 is one of many shapes, sizes, and configurations that can be used to provide a series of chambers for recirculating heat and capturing long wave energy or radiation. As shown, the dome structure 1020 define a Zone 6 or hot side chamber 1030 that at least partially captures heat 1045 released during the performance of a heat generating manufacturing or other process 1034. The heat 1045 circulates within the dome 1020 is at least partially transferred to the energy conversion system 1050 placed within the dome structure 1020 (in the location shown or any other useful location such as at a high, central point to better be exposed to the heat 1045). The heat exchange vessel 1050 allows heat 1045 to pass inward to a Zone 5 or cold side chamber 1054 containing working fluid and configured as discussed previously. The energy conversion system 1050 may take any or a combination of the configurations shown in the attached figures or discussed herein. The process 1034, at least initially, is powered by the power source 1040 (which, of course, may be located outside the system 1000 such as a public utility power grid) via line 1038. The process 1034 may be any of a number of processes that generate significant amounts of heat such as pyrolysis, smelting, heat treatment processes of products and materials, material manufacturing, electrolysis to create water, and many more. In one envisioned application, the process 1034 being powered by the power in line 1058 is the electrolysis of hydrogen and oxygen from water.

The heat 1045 is converted by the energy conversion system 1050 into electricity (or other forms of energy) and as shown, electricity is exported from the dome 1020 to a power grid 1070 and/or power is provided to the process 1034 itself via line 1058. An optional second dome structure or shell 1010 may be provided to enclose the inner dome 1020 so as to capture heat 1024 not converted by the first or primary energy conversion system 1050. The chamber 1015 defined by the inner walls of the outer dome 1010 and the outer walls of the inner dome 1020 can be thought of as a Zone 7 (as shown in FIG. 1) or ambient chamber for the primary energy conversion system 1050 with air, e.g., ambient input fluid, passing from the chamber 1015 back into the Zone 6 chamber 1030, i.e., being recirculated. The chamber 1015 can also be used as a hot side of a heat exchanger (or Zone 6) for a second or secondary energy conversion system 1075 as long as a high enough temperature difference and mass flow are obtainable in the chamber 1015 to provide a supply of energy to the system 1075. The secondary system 1075 converts energy or heat 1024 passing from the inner chamber 1030 to useful energy such as electricity, which is transported to the grid 1070 (or to another load not shown or to the process 1034). While shown simplified, the system 1000 may include other features and functions described throughout this description such as a compressor(s) for providing the chamber 1030 with a desired higher pressure relative to the Zone 5 chamber 1054 of system 1050 or a chiller/condenser provided within the dome 1020 to cool and condense water that has been evaporated during the process 1034.

In some situations, it may be desirable or even necessary to increase the pressure of the energy-rich gas input to an energy conversion system for the system to operate effectively. The system 1100 of FIG. 11 accounts for this desirable function as well as providing other functional elements that are useful for processing the input gas (e.g., cracking the gas) such as to clean it prior to its release. As shown, the system 1100 includes an outer pressure shell 1110 for defining a Zone 6 or hot side chamber 1120. Warmer humid air (or other energy source such as exhaust or other gas streams containing heat) 1102 is input into the hot side chamber 1120 by compressor 1115, which is controlled by controller 1118 and powered by an outside source and, in some cases, by one of the loads 1188, 1190, or 1192, and the input air or gas 1102 may have a relatively high pressure which increases the energy of the gas in the chamber 1120 and typically the mass flow rate within the chamber 1120. For example, the input air 1102 is typically at 1 atmosphere or less and the compressor 1115 acts to add heat to the input air 1102 via compression such that the input air 1102 remains above its due point throughout the hot loop 1120.

A heat exchanger vessel or barrier 1138 is provided within the outer pressure vessel 1110 and defines a high pressure, cold loop or Zone 5 chamber 1146 for absorbing heat from the hot side chamber 1120. In the cold loop 1146, working fluid that is initially and/or periodically provided by the gas molar compensator 1140, pump 1142, and valve 1144 (and, if necessary, released by safety vent 1186) flows to absorb heat from the shell 1138. An inner thermal, pressure isolation vessel 1150 is provided to isolate components within the vessel 1150 thermally from the cold loop 1150, i.e., maintain a desired temperature differential, and to maintain a pressure differential between the interior of the vessel 1150 and the cold loop 1150. Many of the components in system 1100 are similar to those shown in FIG. 1 such as the auxiliary start valve 1148 and are not necessarily explained in detail here.

The interior of the isolation vessel 1150 are divided into three chambers by thermal partitions 1160 and 1174, i.e., Zone 1, Zone 3, and Zone 4. An expander 1154 is positioned in the Zone 1 chamber and includes an inlet valve 1152 for drawing in heated, compressed working fluid from chamber 1146 and an outlet valve 1158 for outputting expanded gas to flow into the Zoned 3 chamber through partition 1160. The expander 1154 converts the work of expansion into mechanical power to rotate shaft 1172, which runs generator 1170 to create electricity that is exported via line 1171 to one or more of the loads 1188, 1190, 1192 and which runs the compressor 1176 in the Zone 4 chamber of vessel 1150. A rarefier and/or auxiliary cold loop 1156 is provided to create a cold reservoir within the system 1100 with condensate tank (Zone 2) 1162 collecting condensated working fluid that is pumped with pump 1164 and motor 1164 through cryogenic loop 1168 where it is heated and then discharged into the cold loop 1146. The compressor 1176 includes an inlet valve 1180 for intaking working gas and an output valve 1182 for discharging compressed working gas into the cold loop 1146. The compressor 1176 is positioned with its heat generating portion or fins 1178 extending outside of the thermal isolation vessel 1150 so as to radiate heat 1179 into the working gas in the cold loop 1146 to capture the heat of compression.

The system 1100 further shows an optional fuel combustion device 1124 within the hot side chamber 1120 that can be used continuously or periodically to effectively run the system 1100 by creating a useful temperature differential between the compressed gas in the hot loop 1120 and the high pressure working gas in the cold loop chamber 1146. In one embodiment, the fuel is hydrogen but many other combustible fuels may be utilized and the combustion device 1124 can be supplemented or replaced by a heating coil or loop as shown in FIG. 8. The system 1100 is also configured for processing the input gas 1102 to control condensation at the release or output of the system 1100 and to collect undesirable components or elements of the gas 1102 (such as greenhouse or waste gases that are preferable not to release into the environment).

As shown, at the outlet of the outer pressure vessel 1110, a pressure relief controller and/or differential condenser device or system 1126 is provided for "cracking" the pressurized input gas prior to release as very cold, dry gas or air 1134. A series of orifices or controlled apertures 1128 are provided in series for sequentially cracking components from the input, humid air 1102. To control condensation or to gather useful water, the first chamber of the device 1126 is utilized via a first aperture 1128 to crack out or condense water from the input air 1102 that is collected at 1130 for use or for release as a liquid. A second chamber in the device 1126 is used to crack out with a second aperture 1128 carbon dioxide in condensed form for collection at 1132. A third and final aperture 1128 is utilized to release the now dry and very cold air with reduced concern of condensation problems at the outlet of outer pressure vessel 1110. As can be appreciated, additional apertures 1128 or differently configured devices 1126 can be used to suit different input gases 1102 to crack out other components of the gas 1102 to control condensation, to collect desirable components of the gas 1102, and/or to reduce or eliminate release of undesirable components or elements in the output gas 1134.

Figure 12:
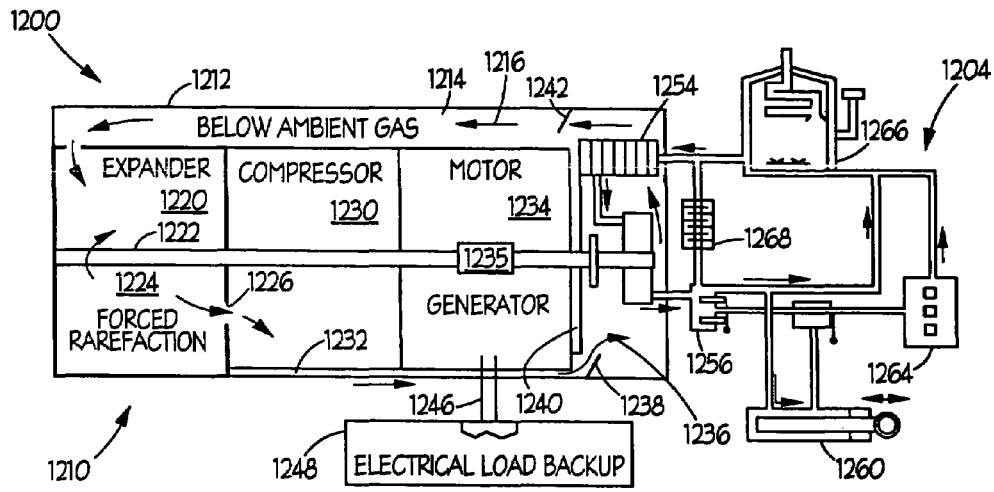
FIG. 12 shows still another energy conversion system that converts heat generated in a hydraulic system to mechanical energy and also pumps and cools the hydraulic fluid.

FIG. 12 illustrates yet another useful configuration for an energy conversion system 1200 that is integrally combined with a hydraulic system 1204 (such as those found in manufacturing facilities, vehicles, and the like) to convert heat generated in the hydraulic system 1204 and to also cool the hydraulic fluid. The system 1200 includes an energy conversion device 1210 having a tank or vessel 1212 defining a cold side loop or cool working fluid chamber 1214 in which a working gas 1216 typically at below ambient temperature flows. An expander 1220 with a forced rarefaction component 1124 are provided in the energy conversion device 1210 to convert expansion work to mechanical energy that rotates the shaft 1222, which may be operated at a relatively constant speed or at variable pitches, loads, and/or speeds. As with the other energy conversion devices, a compressor 1230 receives the expanded gas via expander outlet 1226 and compresses the gas and discharges it via compressor outlet 1232. The compressor 1230 is shown to be driven by the common shaft 1222. A motor/generator set 1234 is provided in the device 1210 to start the device via load 1248 and to generate electricity that is output via line 1246 to the electrical load. A clutch, such as a magnetic clutch, is optionally provided to allow the system 1200 to be operated for periods without generating electricity with the converted energy from the expander used by the hydraulic system 1204. Note, that in the illustrated system 1200, the shaft 1222 does not extend outside the vessel 1212 that lessens leakage that often occurs with rotating seals.

The compressed fluid may be routed into a bypass chamber 1240 or to a heat exchange chamber for exchanging heat with the hydraulic fluid in the system 1204 by operation of bypass gates or valves 1242. The compressed gas 1236 flows through and over the hydraulic system 1204 components in most operational modes. As shown, the hydraulic system 1204 includes a hydraulic pump 1250 that (at least in the illustrated embodiment although this is not a requirement) is driven by the shaft 1222 and can be engaged with another clutch 1252. The pump 1250 draws the hydraulic fluid in the system 1204 through an internal radiator (e.g., a Zone 6, hot side loop) which is configured to release heat from the hydraulic fluid to the compressed but relatively cool working gas 1236 (in the cold loop or Zone 5) within the vessel 1214. The cooled fluid is then pumped through the pump 1250 to a valve manifold 1256 to control hydraulic fluid flow in the system 1204. The manifold 1256 can route flow to hydraulic cylinder load 1260 to perform work, to a hydraulic motor load 1264 to perform work, and or to an optional combustor or heater 1266 (or, in some cases, an auxiliary engine or pump), which is an optional component useful in some embodiments to add heat to the fluid to input energy and drive the system 1200 by creating a desired temperature differential across the radiator 1254. The fluid then flows to the radiator 1254 and/or to an optional ambient heat exchanger to discharge heat to the environment rather than for conversion, which may be useful when the conversion device 1210 is not sized to convert a large enough percentage of the heat generated in the system 1204 to fully control/regulate temperatures of the hydraulic fluid in the system 1204.

Figure 13:
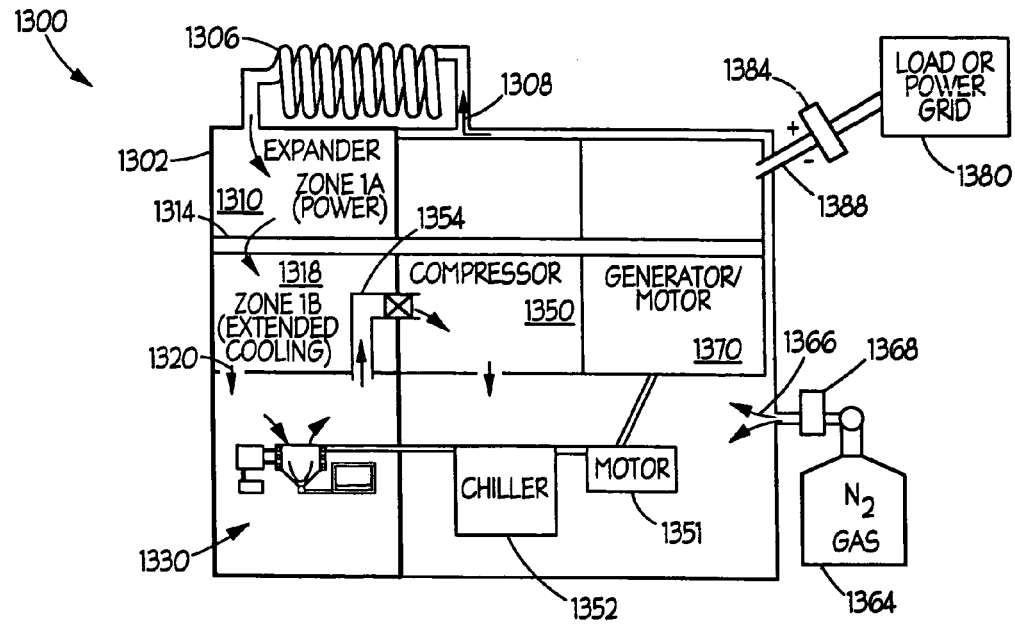
FIG. 13 and 14 illustrate another energy conversion system of the invention illustrating in more detail one embodiment of an extended cooling or auxiliary cooling loop useful for collecting or "making" liquids of normally gaseous elements, such as nitrogen.

FIGS. 13 and 14 are provided to more clearly illustrate and describe the use of rarefaction in creating an extended cooling zone (shown as Zone 1B) and one cooling system for creating the cold reservoir. In some cases, the cooling system is useful for producing a condensate that is a desirable byproduct such as liquid nitrogen. As shown, the energy conversion system 1300 illustrates a heat exchanger 1306 (rather than a full external shell) for inputting heat to a working gas 1308, such as a biatomic gas of nitrogen and helium or other useful biatomic or monatomic gas, that enters a first expander zone 1310 (i.e., the power production Zone 1A) that is enclosed within a thermal isolation and pressure barrier, vessel, or tank 1302. The heated and compressed working gas 1308 acts to expand and do work in the expander 1320 which is converted into mechanical energy such as by rotating the shaft 1314 (with linkages, pistons, and the like not shown for ease of description and not being limiting to the system 1300). The shaft 1314 extends out from the barrier 1302 to drive an adjacent compressor 1360 and motor/generator 1370. The generator 1370 operates when driven to convert the mechanical energy of the shaft 1314 into electricity that is exported form the barrier 1302 via lines 1388 to a load or power grid 1380 with an electronic controller 1384 acting to maintain a desired, such as relatively constant, speed or output rate for the system 1300.

After expanding in the expander 1310, the gas enters a second expander zone 1318 (Zone 1B) in the vessel 1302 where it undergoes extended cooling such as by additional expansion or rarefaction. The rarefied gas 1320 then enters a third zone or condenser (i.e., Zone 2 or a cold reservoir) where a cooling system 1330 acts to condense at least a portion of the working gas with the non-condensed working gas being discharged to the compressor 1350 via compressor inlet manifold 1354. The working gas is then compressed and released into another chamber outside the thermal barrier 1302 (i.e., a Zone 5 or cold loop of the heat exchanger). Also, in this chamber or zone are positioned a chiller 1352 driven by motor 1351 for use in the cooling system 1330 and driven by power from generator 1370. This chamber also provides an inlet for makeup or fill gas 1364 from regulator 1368 that is provided to make up for mass removed from the system 1300 when condensate is formed and collected/removed by the cooling system 1330.

The cooling system or condensate collection system 1330 may take a number of forms useful for causing the rarefied gas to liquefy. One useful embodiment is shown in FIG. 14 (along with chiller 1352 and motor 1351 shown in FIG. 13). As shown, the cooling system 1330 includes a Venturi separator 1338 with a gas inlet 1332 and a gas outlet 1334 through which the rarefied gas 1320 is passed with cooling provided by chiller 1340 and motor 1342 (and in some embodiments, with additional or secondary chiller 1352 and motor 1351). Condensate 1348 (shown as liquid nitrogen as an example but not as a limitation) is pumped with the pump 1344 from the Venturi separator 1338 to a condensate tank 1346. The condensate 1348 can then be returned to the system 1300, such as in the Zone 5 or cold side chamber, or removed to a collection tank 1350 outside the barrier 1302 in systems 1300 used for producing desired condensate byproducts such as liquid nitrogen. In this manner, work gas 1320 close to condensation after forced rarefaction is further cooled by coils of heat pump in Venturi separator 1338. The chiller 1352 may be useful as its motor 1351 expels its heat into the cold loop of the system 1300 for recapture rather than within the thermal barrier 1302.

FIG. 15 illustrates an energy conversion system 1500 similar to that shown in FIGS. 13 and 14 but utilizing two working fluids or gases operating in two conversion loops or devices. As illustrated, a thermal and pressure isolation vessel or tank 1510 is provided that is divided into a primary expander 1525 (Zone 1A) that generates power from a working fluid 1518 exiting a primary heat exchanger 1515. Typically, the working fluid 1518 in the primary loop and expander 1525 is a biatomic gas, such as nitrogen and helium as shown. The expander 1525 rotates the common primary shaft 1528 to operate the compressor 1544 separated by thermal barrier 1540 from the expander 1525 and to operate the generator/motor 1556, which exports power via controller 1588 to grid 1590 and/or load 1590. The working gas 1518 typically is rarefied or further cooled in a second, extended cooling chamber within the expander 1525 and then is discharged to a Zone 2 or condenser chamber in which a cooling system 1534 is utilized to create a cold reservoir and/or to collect condensate by further cooling at least a portion of the working gas. The condensate typically will be formed of one of the biatomic gases, such as nitrogen when the working gas is nitrogen and helium. To assist in providing this extra cooling, a chiller 1550 and motor 1552 in chamber 1548 (e.g., a Zone 3 or Zone 5 chamber) are provided, such as providing chilling to heat pump coils of a Venturi separator. Additionally, an optional heat tube 1520 may be provided for use in starting up the system 1500 and make up gas is provided via supply 1559 and regulator 1558.

A secondary heat exchanger 1562 is provided to heat a secondary working gas 1564, such as a monatomic gas (e.g., helium and the like) by positioning the heat exchanger 1562 within the chambers of the primary conversion device. The positioning may vary for the coils of the heat exchanger 1562 to obtain a desired heat transfer rate to the gas 1564. In one embodiment, the secondary unit 1562 is positioned such that it extracts heat from above the boiling point of nitrogen to above the freezing point of nitrogen. The barrier 1510 surrounds a secondary expander 1560 in which the secondary working gas 1564 expands to rotate the enclosed, secondary shaft 1568 (or other mechanical linkage). The expanded gas is discharged via valve or orifice 1570 in the inner wall 1540 to the compressor 1574 where it is compressed and discharged to the cold side of heat exchanger 1562. The compressor 1574 is run by the common shaft 1568 as is the generator 1578 which converts the mechanical energy into electricity that is provided to the grid 1596 or load 1594 as determined by controller 1592. A heat tube 1584 may be provided for exothermic start up and/or to cool the compressor 1574. A control system 1586 is provided to monitor and control operation of the system 1500 and specifically the controllers 1588, 1592 and gas regulator 1558.

Figure 16:
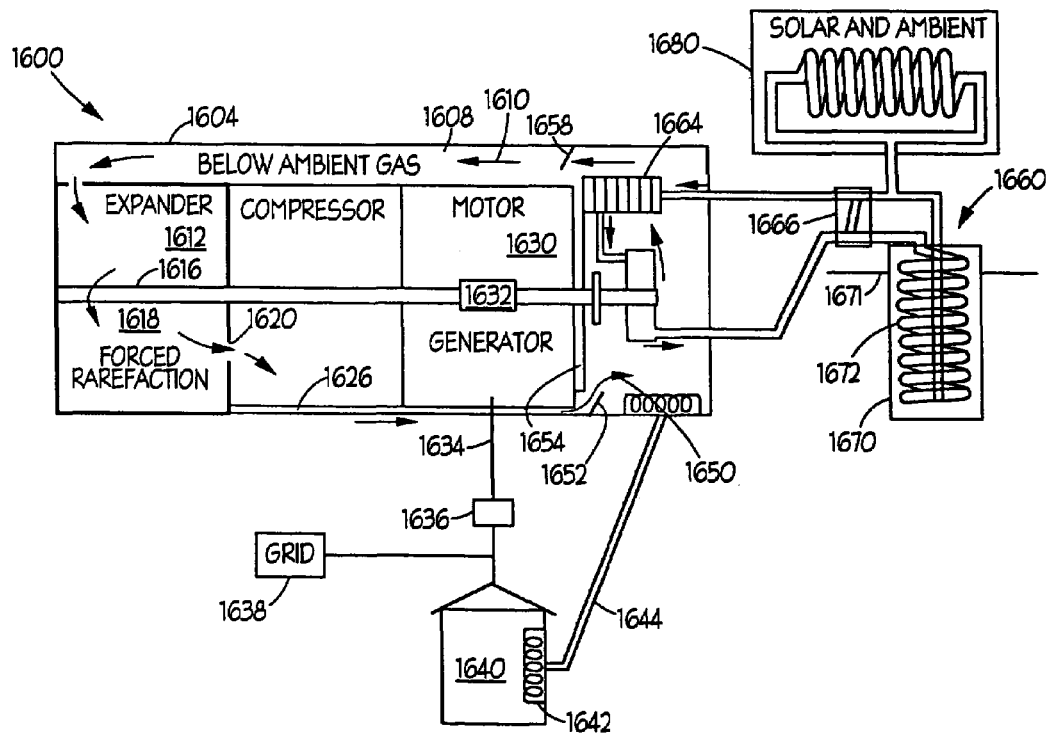
FIG. 16 illustrates an energy system including an energy conversion apparatus or system converting heat energy (e.g., solar, ambient, and/or geothermal) to mechanical energy and electricity that is provided to a power grid and/or one or more structures along with cooling provided by the working fluid.

FIG. 16 illustrates the use of some of the energy conversion ideas of the present invention to provide energy, i.e., electricity, to a residential or commercial building. The building energy system 1600 provides a vessel 1604 that defines a flow path 1608 (e.g., Zone 5) for a working gas 1610 that enters an expander 1612, which is thermally and pressure isolated by vessel or barrier 1614. The working gas 1610 expands in the expander to cause the shaft 1616 to rotate and operate compressor 1624 and motor/generator 1630 when clutch 1632 is engaged as well as pump 1662 when clutch 1656 is engaged. Energy generated by the generator 1630 is exported over line 1634 to grid 1638 or building 1640 as selectively controlled by 1636 (e.g., transmitted to grid 1638 when demand at building 1640 is low). The working gas 1620 is rarefied in chamber 1618 (by further expansion or a cooling system not shown) and exits to the compressor 1624 via barrier outlet 1620. The compressor 1624 compresses and heats the gas 1610 which is discharged though compressor outlet 1626 and directed to bypass 1654 or heat transfer chamber 1650 by operation of gates or valves 1652 and 1658.

Heat or energy is provided for conversion to the system 1600 by a heat supply system 1660. The system 1660 may include a geothermal well 1670 placed below ground 1671 with heat transfer element 1672 through which a liquid is pumped by pump 1662. Alternatively or additively, energy is provided to the hot side liquid in the system 1660 by solar and/or ambient energy that is captured in loop 1680, with a valve controller 1666 used to control hot fluid flow in system 1660. Loop 1680 may be any heat source such as a loop for collecting waste heat from an internal combustion engine, a geothermal process, a manufacturing process, and many more processes that may generate heat. A heat exchanger or radiator device 1664 is positioned within the cold loop chamber 1650 such that the compressed but still cool working gas in the energy conversion device passes over the radiator 1664 to absorb heat energy that is then converted to mechanical energy by the expander 1612. Additionally, the compressed but cool working fluid in chamber 1650 can be used to provide cooling or air conditioning to the building 1640 and to capture heat for conversion from the building 1640. This is achieved as shown by placing a heat exchanger or coil 1648 within the chamber 1650 and passing cooled (and hot) refrigerant via lines 1644 to an air conditioning unit 1642 in the building 1640. The building energy system 1600 is useful for demonstrating another method in which the energy conversion ideas of the present invention can be implemented to capture and convert heat from a variety of sources and to deliver converted energy as electricity, mechanical power, cooling, and in the form of byproducts (such as condensate that is collected).

Figure 17:
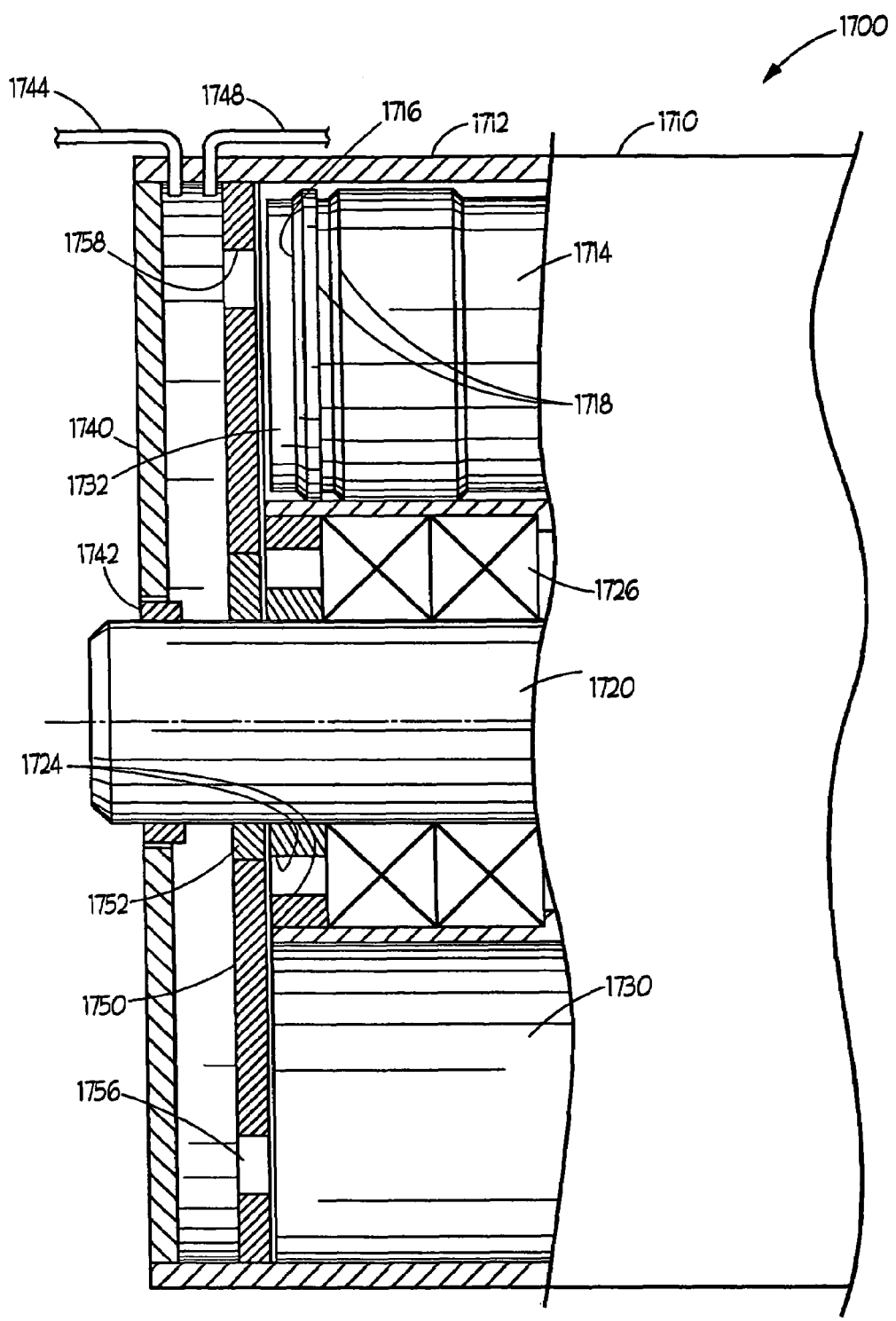
FIG. 17 partial sectional view of a reciprocating piston machine including an eccentric valving system according to the present invention to selectively control input of working gases under pressure to pistons and output of expanded gases in the case of an expander or control of input of expanded working gas and output of compressed gases in the case of compressor (or combined if an integral device)
Figure 18:
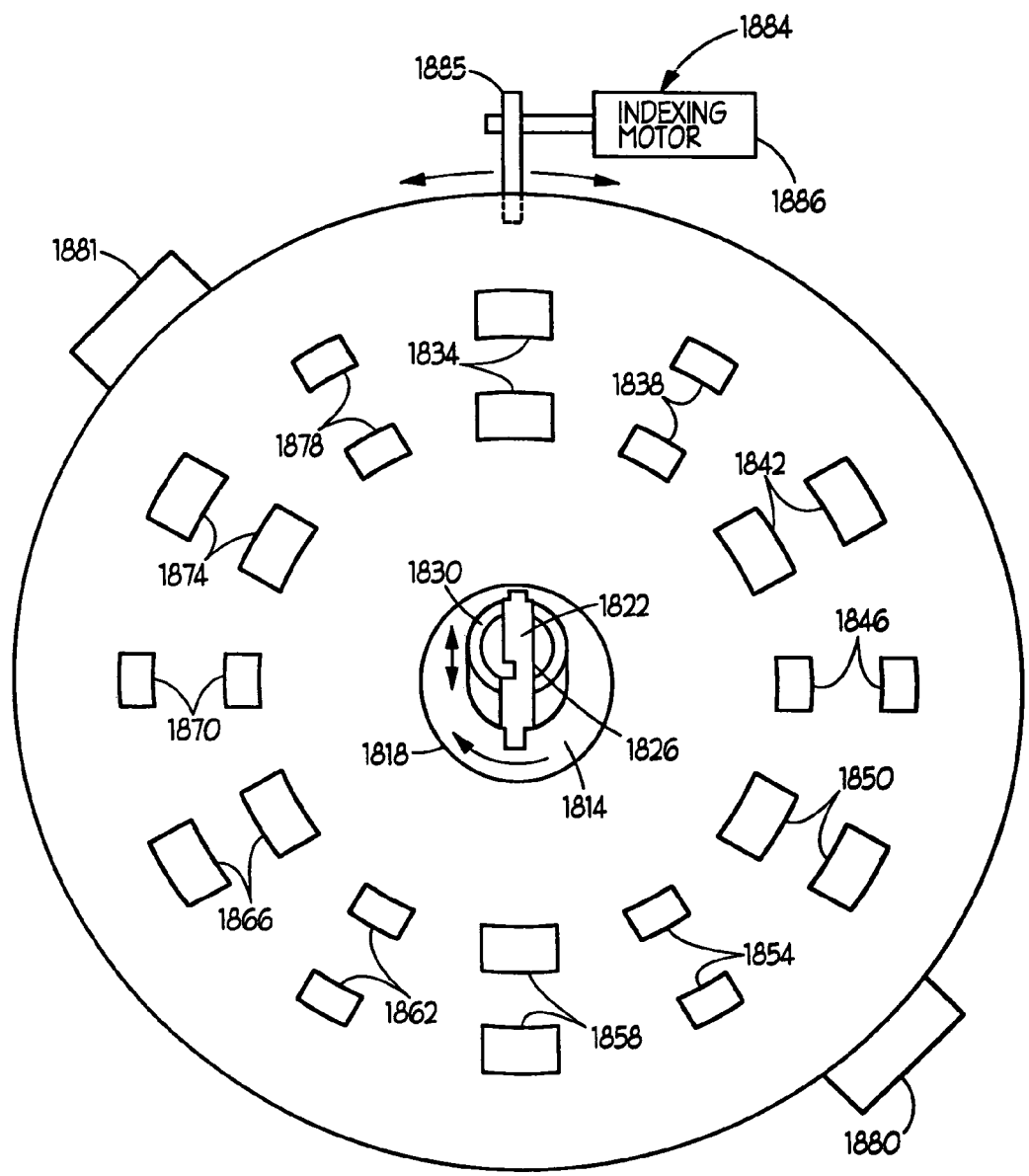
FIG. 18 is an end view of the valve plate of FIG. 17 showing the use of an indexing device to position a pair inlet and outlet holes (having a desired sizing to control fluid flow) over specific pistons when driven by an eccentric drive element.

As discussed above, the compressors, or expander, or integral combinations of such devices may take many forms. In some preferred embodiments, these devices utilize the concepts of nutation for controlling operation of a plurality of pistons or of epicycling in which an eccentric drive element is attached to a drive shaft causing the pistons or piston elements to move eccentrically within a single plane (i.e., rather than a "wobble" as is seen with typical nutating devices). An eccentric valving system 1700 useful for these devices is shown in FIGS. 17 and 18. The expander, compressor, or integral compressor/expander 1710 may take numerous forms such as the nutating spider crank reciprocating piston machine shown and taught by U.S. Pat. No. 5,027,756 which is incorporated by reference herein (and see, for example, FIG. 1). Also, the number of pistons used may vary typically including at least three pistons with six being shown in FIGS. 17 and 18 and the pistons may be single action or double action.

As shown in FIG. 17, the valving system 1700 includes an expander, compressor, or integral device 1710 having a block housing 1712 housing piston cylinders 1730, 1732 in which inlet working gas is injected via inlet 1744 and outlet working gas is output via outlet 1748. A piston 1714 is provided in each chamber 1730, 1732 to be worked upon by the expanding working gas or to compress the working gas with piston surface 1716. Sealing is provided by piston rings 1718. The pistons are linked (not shown) to a drive shaft 1720 journaled in the block housing 1712 with bearings 1726 and sealed with seals 1724, and typically, the linkage will be a nutating device although this is not required.

At the end (or ends if double action pistons are used) of the block housing 1712, a sealing housing 1740 is mounted (typically, rigidly) to define inlet/outlet chambers with seals 1742 provided with shaft 1720. The sealing housing 1740 provides a mounting point for the inlet and outlet 1744, 1748 for the working gas. A valve plate 1750 is journaled or linked to the drive shaft 1720 with eccentric drive element 1752. As the drive shaft 1720 rotates about its axis the valve plate rotates with the shaft 1720 but in an eccentric manner as defined by the shape and configuration of the eccentric drive element 1752. Inlet/outlet holes of 1756, 1758 are placed in the plate 1750 so as to be positioned in a well-defined and "timed" manner relative the shaft 1720 rotation over or adjacent the chambers 1730, 1732 to allow working gas to flow from within the sealing house to the chambers 1730, 1732 and inlet and outlet lines 1744, 1748. The valving plate 1750 replaces standard valves (such as those driven by a camshaft) in nutating and in epicycling devices in at least some of the embodiments of the invention.

FIG. 18 illustrates one valving plate 1750 configuration for use in an expander, compressor, or integral device having 6 pistons or chambers. The plate 1750 has an inlet and outlet surface 1810 in which a pattern of holes are cut to allow working gas to pass through the valving plate 1750 in a predictable fashion. The configuration of the hole pattern may vary widely to practice the invention but can be as simple as that shown with pairs of inlet and outlet holes being selectable by operation of an indexing system 1884 that is operated to index the plate 1750 with indexing motor 1886 and plate connection 1888 to provide variable valve timing and position of different ones of the holes above selected chambers at different times rotation points of the shaft 1814. The plate 1750 is mounted to a shaft 1826 (shown with hollow center 1830 although the shaft 1826 may be solid) with key 1822 that is mated with eccentric drive element 1814 (with the drive element 1814 optionally mounted to plate 1750 with bearing 1818). Plate restraints 1880, 1881 are used to control rotation of the plate within a desired range of eccentric rotation about the axis of the shaft 1826.

In the embodiment shown, valve holes are provided for inlet and outlet of working gas to six piston chambers in a block housing. This is achieved in the shown embodiment with the use of two pairs of valve holes with different sizes to allow throttling of the working gas, such as by an electronic controller as discussed previously. As shown, smaller valve holes 1838, 1846, 1854, 1862, 1870, and 1878 are positioned as a group over the piston chambers when less flow is desired with positioning of the plate 1750 provided by the indexing system 1884 based on input signals from an electronic controller. The eccentric drive element 1814 provides positioning of one of the holes in each pair as in inlet hole and the other hole as an outlet hole based on movement of the eccentric 1814 relative to the shaft 1826. When more flow is desired, the indexing device 1884 rotates the plate 1750 to a next index position such that the larger holes (typically one at a time in each pair) 1834, 1842, 1850, 1858, 1866, 1874 are placed over the chambers of the block housing 1712 based on the movement of the eccentric 1814. Gas flow can further be provided by a manual or remote adjustment of the eccentric drive as shown by the vertical arrow enabling adjustment of the path taken by the valving plate 1750. The control is provided by changing the mounting location of the shaft 1830 within elongate hole or slot of the eccentric drive element 1814 and, as with the indexing motor 1886, control of the mounting location can be provided by an electronic controller (such as controller 192 of FIG. 1) or can be performed manually during initial configuration or during maintenance to provide for an optional variable eccentric throw feature of the valving system of the invention.

Again, the size and shape of the holes can vary, the number of holes used at one time for inlet and outlet can vary, and other modifications in the design can readily be changed to practice the invention with the arrangement shown being provided for illustration only. For example, additional pairs that are indexed for selection by indexing system 1884 can be provided to allow additional flow rates to be selected by a controller. A key feature is the use of the eccentric valving plate and typically, this feature is combined with a nutating or epicycling drive device (as discussed below).

If an integral expanded and compressor device is provided for device 1710, an additional valve plate (not shown), such as 1750 or having a different configuration, is mounted on the opposite end of the device 1710. Typically, a separate index device, similar to device 1884, with an indexing motor is provided to allow separate indexing of the additional valve plate over the additional, integral device (either an expander or compressor) to control gas flow separately to the additional, integral device. Additional, separate control of the two integrated devices can be provided by the operation or mounting of the eccentric drive element to the shaft 1720 such that the additional valve plate epicycles in the same or a unique relative to the valve plate 1750, which again can be variable or selectable with the provision of a variable eccentric throw as described relative to eccentric drive element 1814.

In this manner, the gas flow on the rotary indexed valves and the throw of the eccentric for the expander side and the compressor side of an integrated device (such as device 1710 in some embodiments) are or can be controlled separately and independently from each other. For example, in the energy conversion devices described previously, the configuration of the valves will demonstrably effect the differential pressure between Zone 5 and Zone 3, and a feedback loop would most likely be provided in combination or as part of the electronic controller or control system 192 of FIG. 1 to control the valving, i.e., the position of the eccentric relative to the shaft and the indexing of the plate for each device. Both sides of the device would preferably be independently controlled by a computer or microprocessor to compensate for variations of temperature(s) and load(s) in a way that would maximize, improve, or otherwise control performance and efficiency of operation of the energy conversion device. The combination of shaft speed, working and fuel gas temperatures, working gas flow rates, percentage of condensation, and other operating parameters may affect the "tuning" of the valving system and the separate and independent control provides for compatible and efficient operation of an integral device by allowing separate control of each part of the device without necessarily tying the operations together.

Figure 19:
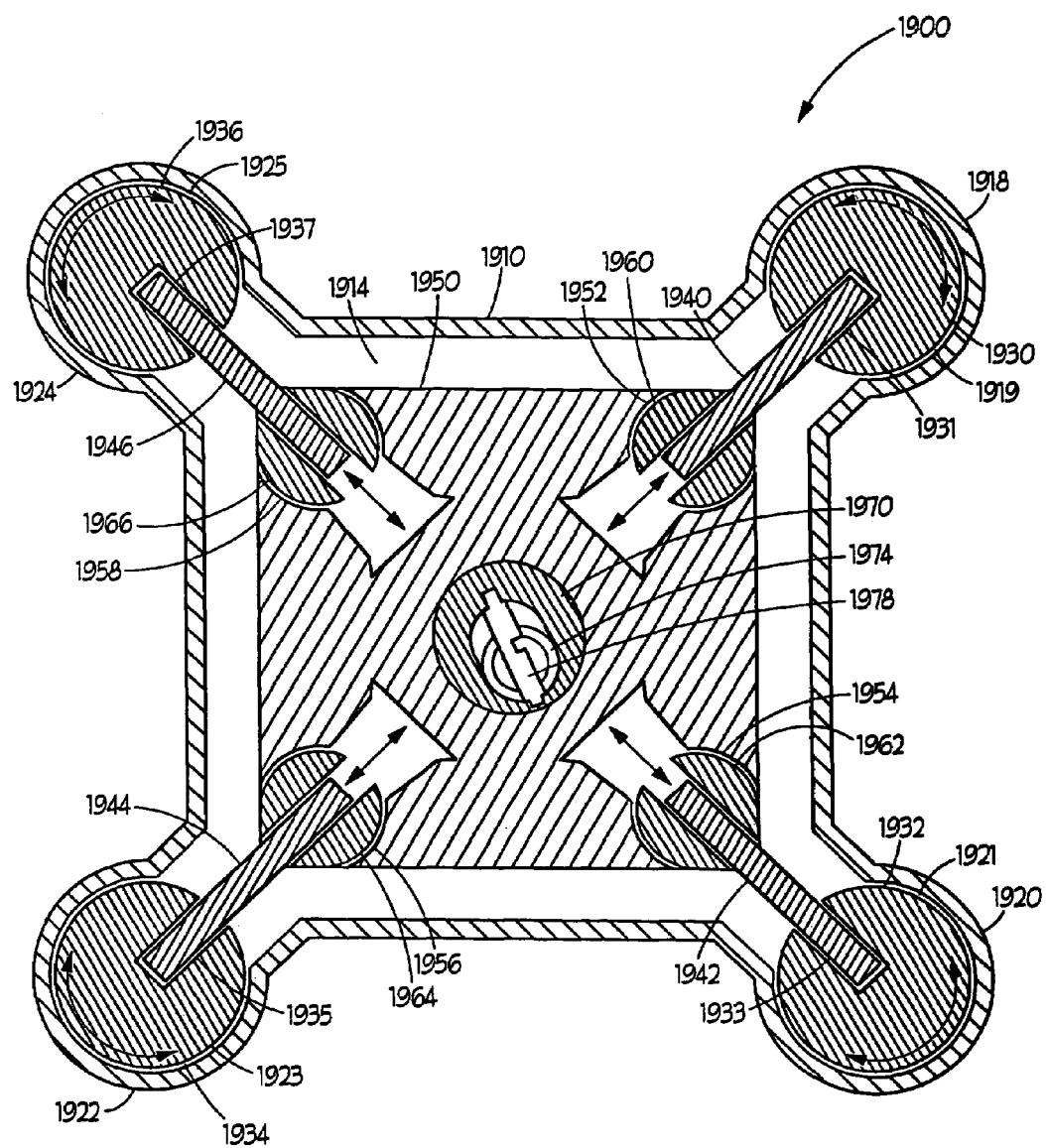
FIG. 19 is a sectional view of an epicycling expander or compressor (or integral compressor/expander) according to the invention including a sealing system of the present invention with a combination of corner rotating seal members and sliding partition members for allowing the epicyclic movement of a piston element within a housing with effective sealing of working gas at mating components.

FIG. 19 illustrates a cross-section of an epicycling device 1900 that may be used for an expander, compressor, or integrated device in any of the systems described herein. Generally, the device 1900 utilizes a piston member that is rotated on a single plane by an eccentric drive element mounted to a rotating shaft. Partitions extending outward from corners of the piston element are used to define expansion and compression chambers, with the number of such partitions typically being at least three, such that the shape of the piston element and housing ranges in cross section from a triangle, to a square, and to other multi-sided polygons. These shapes can be difficult to seal and hence, an important feature of the invention is the sealing systems provided for such epicycling devices 1900.

As shown, the device 1900 includes a housing 1910 that is generally square with four walls. At the corner of adjacent walls, circular corner housings 1918, 1920, 1922, 1924 generally comprising elongate, hollow cylinders similar to piston chambers that extend from openings at each corner of the device 1900, e.g., in a near full circle such as about 270 degrees or more, to define corner chambers 1919, 1921, 1923, 1925. Within each corner chamber 1919, 1921, 1923, 1925 is positioned a rotating outer seal member 1930, 1932, 1934, 1936 that are free to rotate about their center axis but typically are fully restrained from movement along these axii (such as with end caps to the chambers 1918, 1920, 1922, 1924 not shown). In operation, the outer seal members 1930, 1932, 1934, 1936 generally do not fully rotate but instead rotate in an arc of about 270 degrees or less to provide movement of a mated partition element 1940, 1942, 1944, 1946 that slidably engage the outer seal members within receiving slots 1931, 1933, 1935, 1937.

The partitions 1940, 1942, 1944, 1946 mate at the other end with a slot 1952, 1954, 1956, 1958 in the piston element 1950 and a through slot in inner seal members 1960, 1962, 1964, 1966 that are seated within outer curved portions of slots 1952, 1954, 1956, 1958. The piston element 1950 is journaled to a drive shaft 1978 with key 1974 that extends into eccentric drive element 1970. During operation, the shaft 1978 rotates about its central axis causing the piston element 1950 to epicycle within the housing 1910 which causes the partitions 1940, 1942, 1944, 1946 to slide in and out and to pivot which, in turn, causes the four pairs of outer and inner seal members 1930, 1960, 1932, 1962, 1934, 1964, 1936, 1966 to rotate about their central axis. Expansion and/or compression chambers are defined by the piston element 1950 and partitions 1940, 1942, 1944, 1946 on an ongoing basis as working gas is injected by valves or valving plates (not shown in FIG. 19).

Figure 20:
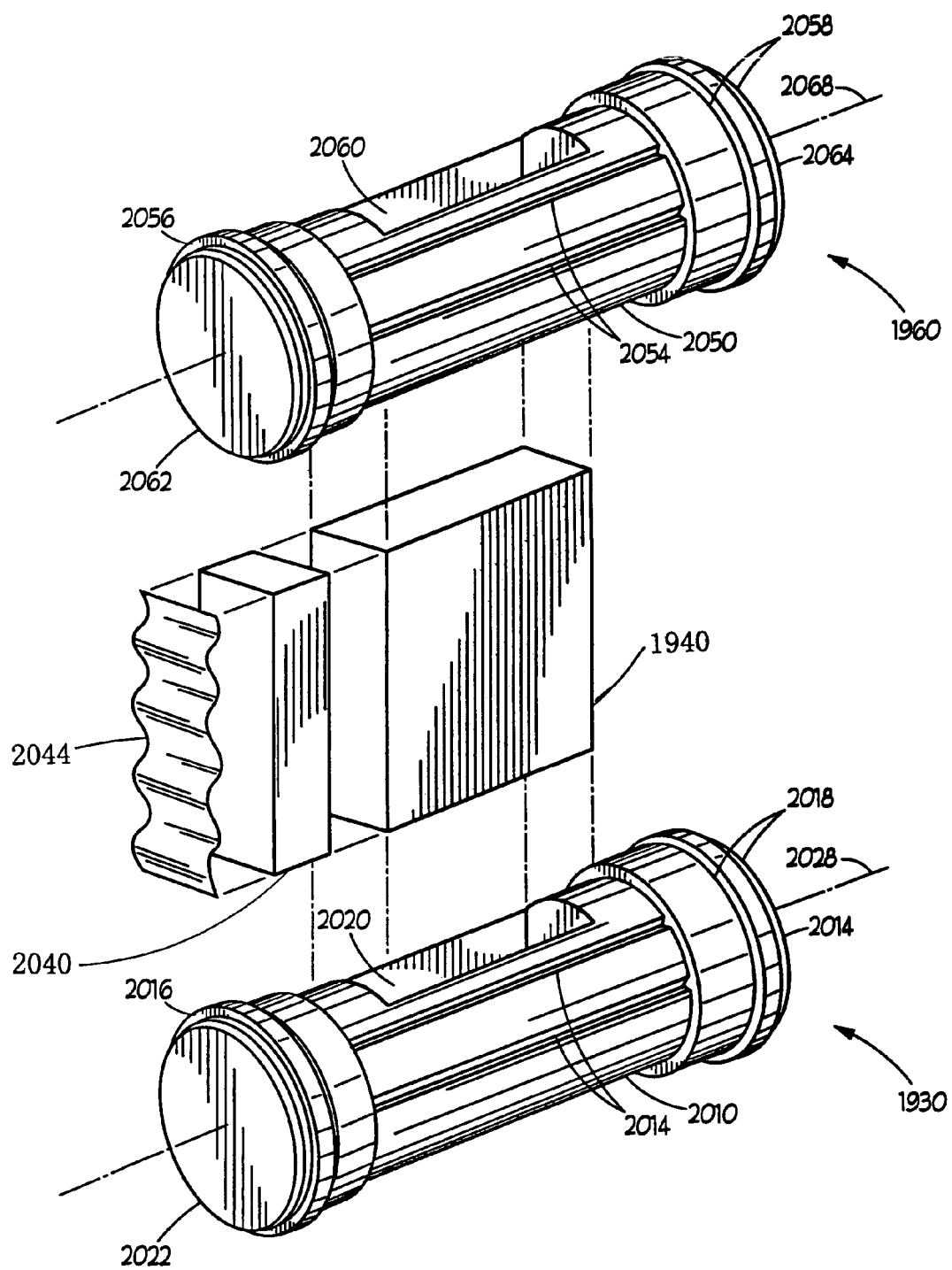
FIG. 20 is an exploded view of one rotating seal member pair (an inner and an outer sealing member) used with one partition member showing the use of a combination of ring seals and elongate raised seals to seal the rotating seal members.

According to an important aspect of the invention, the configuration of the epicycling device 1900 facilitates sealing of the working gas in defined chambers. FIG. 20 illustrates one useful arrangement in which an inner sealing member 1960 is paired with an outer sealing member 1930 with a partition slidably engaged there between. Each of sealing members 1930, 1960 is configured for sealing lengthwise and about its circumference. To this end and for ease of manufacturing, the sealing members 1930, 1960 generally take the shape of a double action piston with elongated bodies 2010, 2050 with larger sealing ends 2022, 2024, 2062, 2064. During operation each sealing member 1930, 1060 rotates, at least partially, about their central axii 2028, 2068.

Sealing between the sealing members 1930, 1960 and the corresponding housing 1918 and recessed surface 1952 of piston element 1950 is provided with a combination of raised seals. In one embodiment (not shown), a single ring seal is provided about the periphery of each sealing end 2022, 2024, 2062, 2064. In the illustrated embodiment, improved sealing is achieved by providing one, two, or more ring seals 2016, 2018, 2056, 2058 on each seal end 2022, 2024, 2062, 2064. Additionally, one or more elongate raised seal members 2014, 2054 is provided along the lengths of the elongate bodies 2010, 2050 between the seal ends 2022, 2024, 2062, 2064 (with the raised seal members 2014, 2054 being raised to about the height of the seal rings to contact the housing 1918, 1952 inner surfaces).

As shown, an elongate slot 2020 is provided that extends at least part way through the elongate body 2010 to receive the partition 1940 to allow the partition 1940 to move in and out of the body 2010 while being guided by the controlled movement of the seal member 1930 (i.e., rotation about the axis 2028 within the chamber 1919). In some cases the slot 2020 may be through the body 2010 with the housing 1918 shaped with a female portion to receive the partition 1940. The body 2050 of the inner seal member 1960 includes a receiving slot 2060 extending through the body 2050 to allow the partition 1940 to extend through the body 2050 and into the recessed surface 1952 of the piston element 1950 at certain points in the epicyclic movement of the piston element 1950.

Sealing is provided between the partition 1940 and an end cap (not shown) for the housing 1910. As shown, magnetic seals are utilized in which the partition edge 1940 and a partition seal 2040 are oppositely charged and a spring 2044 is used to force the seal 2040 to a sealing, near-contact position relative to the edge of the partition 1940. The systems of the present invention are especially apt for magnetic bearing and seals and particularly for superconducting bearings and seals because of the availability of electrical power as well as cryogenic liquids as byproducts of the energy conversion processed that can be utilized for bearings and seals within energy conversion components and systems, such as compressors and expanders. To control wear between the inner seal members 1960, 1962, 1964, 1966 and the partitions 1940, 1942, 1944, 1946 air bearings may be utilized configured according to known designs, such as by placing numerous holes in the partitions 1940, 1942, 1944, 1946 with high pressure on one side. For example, as working gas is pressurized, holes allow gas to be released in proportional manner to create a gap between the slots 2060 (and, in some cases, 2020) and the partition 1940. Alternatively, in bigger devices, pressurized oil can be utilized to reduce friction between these components, and in some devices, magnetic bearings (or superconducting bearings) can be provided by using opposing magnetic polarities in contacting surfaces and springs or other forces pushing the contacting surfaces together. The size of the components of the system 1900 can vary from small devices for use, for example within electronic components, to large devices for use in automobiles, to devices used within factories and outside where size and weight are not limiting. Hence, the materials utilized may vary significantly from lightweight materials to heavyweight, cheap materials such as concrete. For example, concrete can be used in some systems 1900 for stationary components such as the housing 1910 and, in cases where magnetic and superconducting technologies are used for bearings and seals, for moving parts such as piston 1950 and partition 1940 and more.

Figure 21:
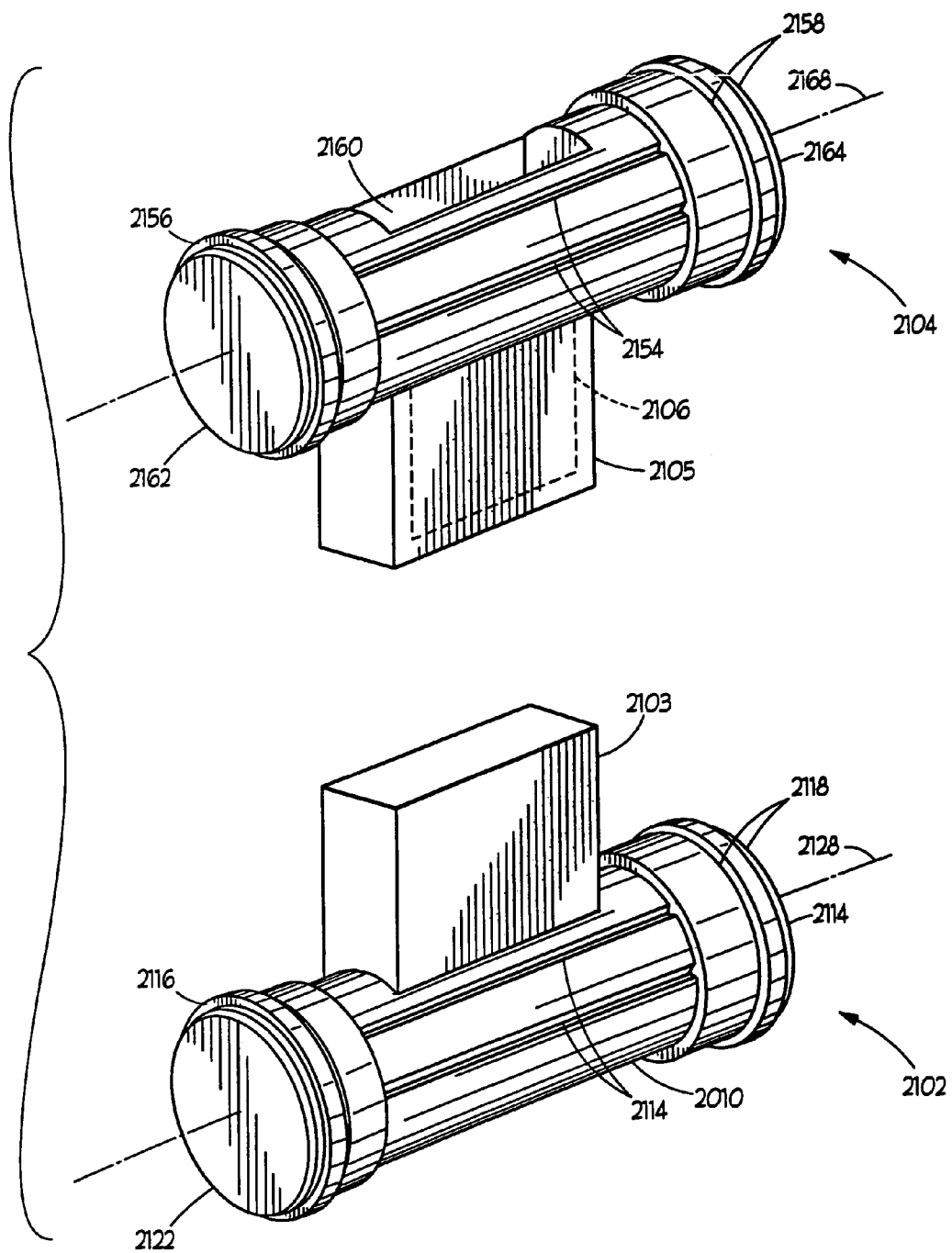
FIG. 21 is an alternative embodiment similar to FIG. 20 showing the use of a two-part partition element having a male and a female portion attached to a rotating seal member pair.

FIG. 21 illustrates another embodiment of the seal member pairs. In this embodiment, the outer seal member 2102 rotates about axis 2128 to move the partition 2103 that is shown inserted into a slot, such as slot 2020 of FIG. 20, for moving in and out of the body 2110. The outer member 2102 further includes enlarged seal ends 2122, 2124 with seal rings 2116, 2118. Horizontal or side sealing is provided with raised, elongate seals 2114 along the length of body 2110. The inner seal member 2104 includes a female portion or partition receptacle 2105 extending outward from elongate body with a hollow portion 2106 for receiving the partition 2103 and guide it to outlet or slot 2160. The inner seal member 2104 further includes seal ends 2162, 2164 with seal rings 2156, 2158 and during operation, the inner seal member 2104 rotates, at least partially such as up to about 270 degrees, about axis 2168.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, numerous working fluids can be used and combined with a variety of input, energy-rich fluids to obtain desired temperature differentials and cold reservoir temperatures. To provide more specific examples, the working gas may be nitrogen and the cold reservoir of Zone 2 may be 77 Kelvin at one atmosphere pressure with ambient air may be used as the input fluid at about 300 Kelvin. In another case, helium may be used as the working gas again using ambient air as the input fluid but in this case a lower cold reservoir or bottom temperature would be desirable such as low as about 4 Kelvin. In contrast, some embodiments may use water or other liquid as the working fluid and in these embodiments, the cold reservoir may be relatively "hot" at about 375 Kelvin at one atmosphere with the input temperature of the input fluid being correspondingly much higher such as up to 1100 Kelvin or other useful temperature depending on the make up of the input fluid.

In some cases, it may be desirable to store excess electricity created by a generator during a low demand time for use later within an energy conversion system. For example, a thermal battery can be created by using excess or extra converted energy to heat a brick or apparatus of thermal "storage" materials. Then, when useful such as at startup or during periods when the input fluid has become cooler (such as when simply using ambient air) the stored heat can be released to the working fluid (such as in a Zone 5 location or in Zone 6 to heat the incoming fluid, e.g., when water or other liquid is utilized having a relatively higher heat transfer coefficient than gases) to assist the system in maintaining stable operations.

Figure 10:
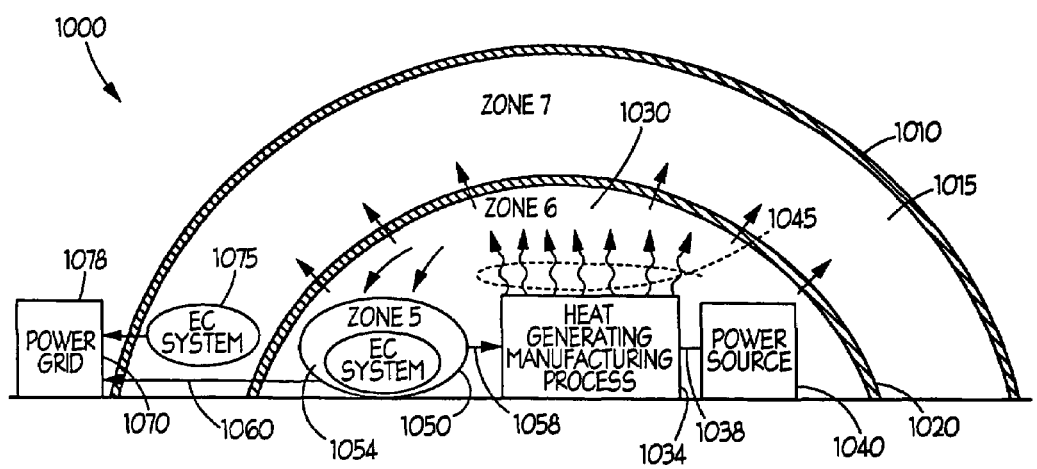
FIG. 10 illustrates in simplified form an enclosed energy system incorporating an energy conversion system to capture or convert energy rejected from a process (such as almost any common manufacturing process) occurring within an interior space of an enclosed space ranging from a large dome or building structure to a very small container.
Figure 11:
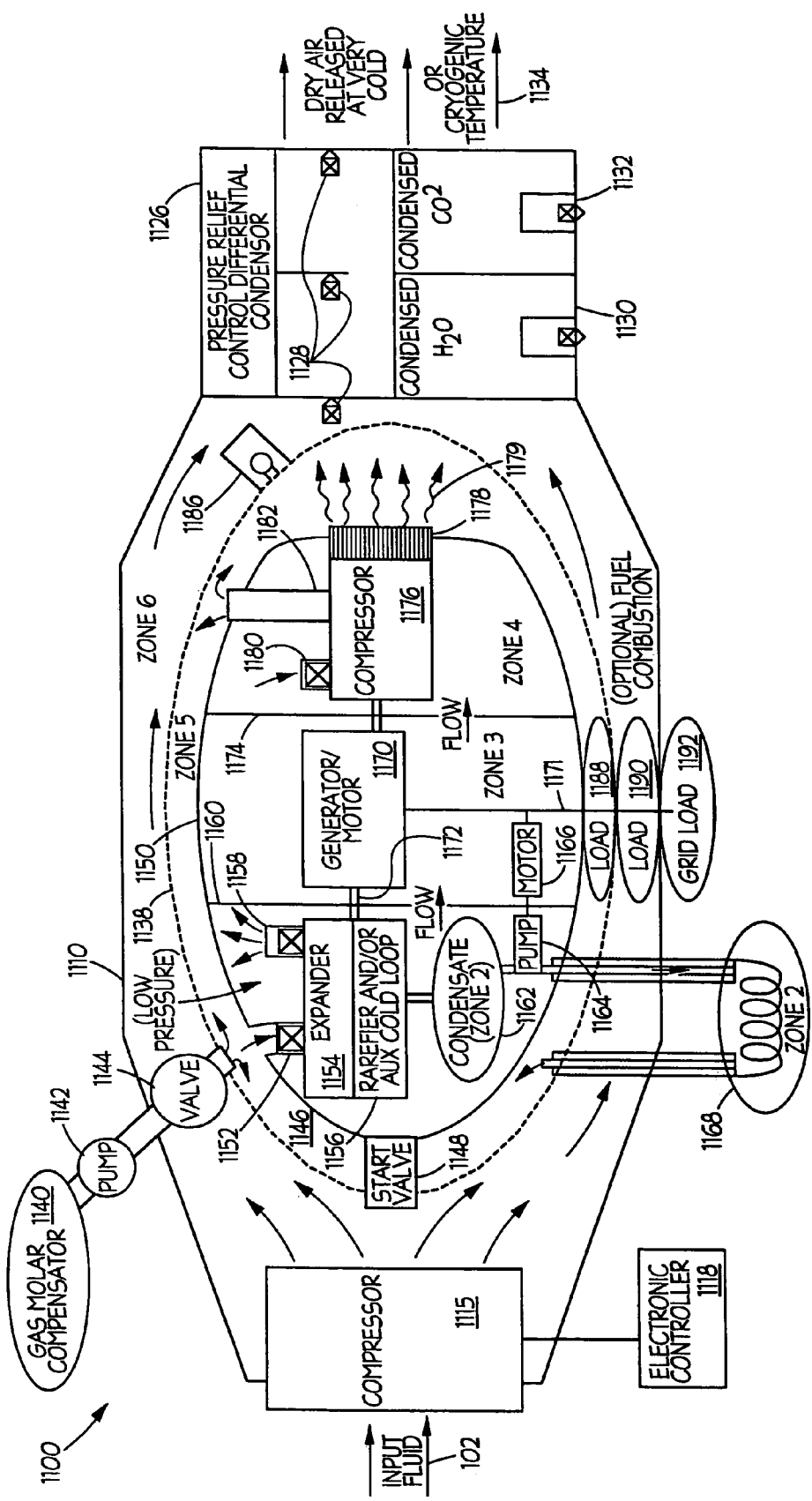
FIG. 11 is an energy conversion system similar to the system of FIG. 1 in which a compressor is used to compress input hot air or fluid into the hot side of the heat exchanger and being adapted for controlling the release, e.g., cracking, the hot fluid from the system to control condensation and/or collect components from the hot fluid.

The system 1000 of FIG. 10 provides a specific example of the general idea of "energy scavenging vessels or structures" that utilize an energy conversion device with a double-walled airtight container with a space between to circulate a gas or liquid. The dome structure is sometimes insulated on the outer wall, sometimes on the inner wall and sometimes on both. The waste heat accumulated between the two walls is extracted from between the "hollow" space and converted to power by an energy converter to be sent inside the enclosure for heat or to do more work or sent outside to control temperature or produce power, depending on the desired application. This allows waste heat to be recaptured from internal processes and recirculated. The construction can also be used to provide a space with controlled temperature, pressure, or humidity on the interior for various process applications. This concept supports myriad process applications to be performed in an energy efficient way improving the commercial viability of many processes applications. The space can be as large as a building or be very small, and it can have many different "zones" with different temperatures and various other conditions radiating from a core or as an individual zone within a zone. Some of the applications which will be enhanced using this configuration include: electrolysis of water to hydrogen and oxygen, smelting and metal processing especially when an induction arc furnace is used, desalination of salt water, pyrolysis of organic material and recovery of energy without burning with oxygen, fractional distillation of hydrocarbons and other compounds to elemental form, exothermic chemical processes, cryogenic processes, intensive agricultural and animal husbandry, and many others. The same principles can be adapted to power, heat and air-condition people's homes, offices, factories and dwellings, and other types of buildings while creating a safer more environmentally friendly dispersed electrical power system. The technology can be applied to create a "tropical retreat" dome in Antarctica, on the Moon, other planets in the solar system or our local neighborhood. In these cases, the "reuse of heat energy" and its conversion to high-grade energy to do more work greatly increases productivity and reduces costs. In many cases, the heat recapture described above allows the development of processes that are not practical using other methods.

"Self-powered water pumps" of all sizes and capabilities can employ the energy conversion system of the invention to use the heat of the water to create the power needed to pump (in most cases the same) water up hill. This concept combined with the ability to easily and cheaply desalinate water enable use of the same water several times on the same farmland or in the same city. The use of the energy conversion systems for desalination and refining salt water and to produce metals and other natural resources using evaporation and/or freeze drying process can allow collection of natural resources and metals that are dissolved and suspended in saltwater, without digging holes in the ground or degrading the environment and can provide water as well as the materials used to construct machines and build structures and products.

Another application of the energy conversion devices and systems of the invention uses both the electricity created by devices and systems and the cryogenic temperatures created (such as in the Zone 2 cryogenic loops shown in the figures). More particularly, superconducting electrical power lines and electrical power transformers, which promise to use inexpensive and known superconducting materials to transmit power long distances with low line losses, are not now practical even though the materials used as the conductors are now relatively inexpensive. This is because no method of supplying low cost cryogenic fluids exists today. By combining "low temperature" (liquid helium) superconductor materials or "high temperature" superconductor materials (liquid nitrogen) with these elements made as cryogens using energy conversion system features described herein and double walled containers cooled by byproducts of energy conversion systems, super conductors become practical to use for commercial purposes. Also, superconducting electric generators, electric motors, superconducting magnetic bearings, superconducting coils for magnetic linier bearings and linier propulsion become economically feasible as well as much easier to manufacture and smaller.

While generally the components and materials used in the energy conversion systems discussed above are not limiting, these systems can include superconducting devices and technology to improve efficiency and enhance operation. One embodiment of energy conversion systems (such as system 100 or system 1100) is constructed using superconducting magnetic bearings, superconducting motor/generators, and/or superconducting magnetic repulsing seals. This reduces the size and weight of the device and allows it to operate at extremely low friction losses to improve the efficiency and reduce the noise produced by operating the unit. The problem of friction losses is inherent to all rotating and reciprocating machines, and it is the dream of engineers to work with little or no friction in bearings. The energy conversion systems of the invention are easily adapted to create cryogenic conditions and to maintain these conditions at low cost, whereas for most machines the cost of keeping the cryogenic fluid cold is prohibitive and cancels any savings made from reductions in friction. One result of circulating the cold working gas within the energy conversion device or system is that the working gas naturally cools the operating components that are heated by friction. This parasitic loss reduces a conventional energy conversion device output. By reducing internal friction using magnetic bearings and smaller efficient motors, the device or system will cost less and be smaller and lighter for a given output capacity and will have less internal heat recirculation.

To further describe the invention, it may be useful to provide further description of the inventive system and operating principles generally underlying and supporting the energy conversion systems described above and claimed below. Devices constructed according to the invention, e.g., devices incorporating a cycle that could be labeled a McFarland Cold Cycle, include a heat engine with an expander and a compressor configured as a modified reverse Brayton Cycle. The modifications include thermal and pressure isolation of the expander in which power is added to the device by beginning the circulation of a working gas that eventually creates a differential of temperatures between a "cold reservoir" inside of the device and a "hot reservoir" (or higher temperature area) outside the isolation barrier or vessel that creates a state of non-equilibrium that is maintained as long as a load outside the device accepts power as it is exported from the isolation vessel. During a start up phase, the device is exothermic and expels heat through a heat exchanger or with the use of heat pipes. After a period of time, the differential of temperatures reaches a point where the temperatures of the working gas within the heat exchanger is less than the temperature outside (in the hot side) and the device becomes endothermic. The device then cools the energy source during heat exchange and produces power or converts heat energy that is exported form the thermally isolated expander to a load.

During operations, certain pressure and temperature relationships are generally maintained within a system, such as system 100 of FIG. 1, which can be discussed with relation to the labeled zones. Zone 5 is at a lower temperature than Zone 6 while the system is at a normal steady state of operation (in contrast, at start up, the temperature in Zone 5 is initially higher). Zone 3 is at a lower temperature and lower pressure than Zone 5. The working gas decreases in energy as it passes through the expander and condenser (i.e., through Zones 1 and 2), has an intermediate increase in energy as the working gas is compressed by compressor (i.e., Zone 4) and where heat from friction is scavenged from the rotating and rubbing components from Zone 3, and the working gas reaches its high temperature and pressure inside the heat exchanger (i.e., Zone 5) in which it also absorbs some waste heat generated as friction from the moving components of the system. Assuming that the moles of gas are the same, the volume of gas pumped by the expander (i.e., Zone 1) is more that the volume pumped by the compressor (i.e., Zone 4). The difference in volume has a direct relationship to the amount of power created and exported out of the thermal and pressure confines of the device. The expander (i.e., Zone 1) is thermally isolated from the outside and is maintained in non-equilibrium, and hence, exports energy outside of the confines at a rate that maintains such non-equilibrium. The working gas has its temperature lowered in the expander (i.e., Zone 1) below a temperature occurring from work of expansion, such as using force rarefaction or additional cooling with additional cooling devices.

In contrast to standard pumps and internal combustion engines, the expander produces enough power to turn a shaft that first powers enough cooling either through forced rarefaction or the supplementation of another artificial or power parasitic bottoming cycle to equal the friction produced by the expansion engine after cold dis-equilibrium is reached in the start cycle. The expander produces enough power that it can use some of the power to transport the friction from the expander to Zone 5 through various means while keeping the temperature in Zone 5 below the "ambient temperature" in Zone 6. All the work done through the system machinery, i.e., the compressor, pump, rotating bearings, electric generator, mass flow of the working gas, and the like can not require more energy than the energy available and left over from the expander after the amount of energy used to cool the expander is exported from the inside of the energy conversion system or isolation barrier. A low temperature is typically initially created by using electricity to run the components in reverse or as a refrigerator. The minimum amount of electricity (per unit of time) that is exported from the energy conversion system is the amount of heat created (in the same unit of time) in the friction of running the expander.

The remaining power is the maximum power that can be used to power all of the other mechanical and electrical components within the Zone 5 heat exchanger boundary. This energy is turned into heat and is recirculated but the temperature stays below the outside temperature and energy still flows inward because the generator exported heat from the expander outside to maintain the dis-equilibrium. Some amount of heat flows into the cold area of the expander and other zones through the insulation, which is a parasitic loss that is relatively low as the system is moving all the time but this loss is then added to the amount of friction heat for both the expander or Zone 2, Zone 3, and an optional Zone 1 as energy is used to scavenge it and then export it out to Zone 5. In one preferred embodiment, the power distribution from the expander is as follows (but other distributions are anticipated to be useful and often desirable): one third exported as electricity; one third friction, infiltration of heat, and parasitic cooling; and one third power to pump, compress, and move the working gas(es). The bearings to be utilized within systems of the invention may be standard or normal bearings, more preferably magnetic bearings, and most preferably superconducting magnetic bearings (as well, in some cases, seals and generators).

The relationship of engines used for the energy converter calls for the relationship of the displacement volume used by the working gas in the engine versus the capacity (strength and weight) of the crankshaft components generally to be greater for the energy converter system than an internal combustion (IC) engine. IC engines generally have dense fuels that produce great pressures and the material strength of the materials of the engine and bearings become the limits of the engine. Diesel engines are stronger because pressures, compression ratios and temperatures are greater, with an Otto cycle device burning gasoline being next. Burning hydrogen in a car or device designed for gasoline can lead to unnecessarily high friction in the crankshaft and power linkages and reduces efficiencies.

This same concept applies with the energy converter system. Moving relatively larger quantities of the working gas against a crankshaft mechanism that is proportionately tuned for the loads will increase efficiency. This tendency can be counter balanced by increasing the relative pressure within the device where the pressure differential for each zone is multiplied by a given factor and the crankshaft and other components are designed accordingly. Even with the same temperature differential the fact that more molecules of the working gas will hit the walls of the cylinder and piston (for example) and do a proportionately greater amount of work will require that the crank components be optimized or well-designed.

When converter devices are built using superconducting magnetic bearings friction is almost nothing because there will be no actual contact between the components. By varying the intensity of the field on the magnetic bearings, load-bearing capacity can be tuned for the application and machines can have internal feedback that automatically compensates for the load. These features will greatly reduce the friction of operation.

Further, it may be useful to further explain some of the "thermal battery" processes occurring in the energy conversion systems and devices described above. The first concept is "delay, extraction and change of state," which occurs is in Zone 6 when a compressor is used. The compressor heats the working gas (increasing the temperature differential), and this lets heat accumulate, allowing a longer time for the heat to be extracted by the heat exchange into Zone 5. The greater temperature differential also increases the rate of heat transfer, allowing for a smaller, lighter heat exchanger and adds to the efficiency of operation of the overall device, which lowers cost. The step of "delaying" the gas temporarily to improve heat transfer will also usually be employed in the working fluid in Zone 5 to improve heat exchange.

In a "heat scavenging structure" such as the dome structure 1000 of FIG. 10, heat may be extracted rapidly or it may be allowed to accumulate to increase the internal temperature of the space for a desired process. Heat can then be extracted at the rate necessary to maintain that temperature. The same concept applies if the "heat scavenging structure"

is used to store heat that is sent there (say by an electric circuit to a resistance load) to act as a "heat battery." This is a very valuable capability for control and to extend operations. For the same weight, the energy stored in an insulated mass is hundreds of times greater than the stored potential energy of the same mass of lead acid chemical battery, for example. Typically, "heat batteries" are placed in Zone 5 and Zone 6. The simplest "batteries" would have a mass of phase change material like salt, with electric resistance coils inside and an adjustable "cooling" apparatus to vary the amount of heat reintroduced to the energy conversion device or system. This simple device provides a unique capability enabled by the energy conversion systems of the present invention uses of a change of state from kinetic energy to electrical potential to heat energy and which can convert heat energy back to mechanical or electrical potential again.

This ability to "recirculate" energy in this manner is important because it allows a "heat battery" to be viable for a long period of time like a chemical battery. When the insulated hot mass is surrounded by a layer of air (or other fluid) that is recirculated to keep it's temperature below the temperature of the heated mass and the temperature of internal container as is shown in the dome system 1000 of FIG. 10, energy can be recirculated with minimal losses over a long period without degradation. This system acts as an equivalent to a flywheel, kinetic potential reservoir (hydro dam and generator) or chemical battery and is not limited to size or a particular configuration or type of material. Using a cold loop to extract the heat into a colder zone or by using the compression and extraction method described herein, energy can be extracted out of the mass below ambient temperature and it can then be left un-insulated to heat up over time from the environment. Low temperatures can be maintained within the structure with minimal infiltration by using the "heat scavenging" hollow wall structure and appropriately insulating internal or external walls depending on the rate of energy transfer which are acceptable to the energy conversion devices and systems.

I claim:

1. An epicycling device with improved sealing, comprising:
    a housing defining a piston chamber having at least three walls, wherein adjacent walls are spaced apart;
    a piston element linked eccentrically to a drive shaft passing through the center of the piston element, wherein the piston element is positioned within the housing, has a cross sectional shape for mating with the housing walls, and includes a generally circular recessed surface at each corner;
    seal housings with a hollow cylindrical cross sectional shape with openings mating with the space between the adjacent walls;
    an inner seal element positioned within each of the recessed surfaces, the inner seal element including an elongate cylindrical body with a slot passing therethrough;
    an outer seal element positioned within each of the seal housings, the outer seal element including an elongate cylindrical body with a slot; and
    a partition positioned between each pair of the inner and outer seal elements and slidably engaged with the slots in the seal elements,
    wherein each of the seal elements includes a ring seal around each end of the elongate cylindrical body.

2. The device of claim 1, wherein the seal elements include a raised seal element extending parallel to the central axis of the elongate cylindrical body positioned on an outer surface of each of the seal elements.

3. The device of claim 1, wherein the partition includes an air bearing, an oil bearing, or a magnetic bearing configured such that a bearing separation distance is maintained between the partition and the inner seal element at the contact surface.

4. An epicycling device with improved sealing, comprising:
    a housing defining a piston chamber having four walls;
    a piston linked eccentrically to a drive shaft passing through the center of the piston, wherein the piston is positioned within the housing, has a square cross sectional shape for mating with the housing walls, and includes a generally recessed surface at each corner:
    seal housings with a hollow cylindrical cross sectional shape with openings provided between adjacent ones of the tour walls;
    an inner seal element positioned within each of the recessed surfaces, the inner seal element including an elongate cylindrical body;
    an outer seal element positioned within each of the seal housings, the outer seal element including an elongate cylindrical body; and
    a partition positioned between each pair of the inner and outer seal elements to sealably connect the seal elements,
    wherein each of the inner and outer seal elements includes a ring seal around each end of the elongate cylindrical body.

5. The device of claim 4, wherein the inner and outer seal elements include a raised seal element extending parallel to the central axis of the elongate cylindrical body positioned on an outer surface of each of the seal elements.

6. The device of claim 4, wherein the inner and outer seal elements include slots in the elongate cylindrical bodies and wherein the partition is received in the slots to slidably mate the partition with the inner and outer seal elements.

7. An epicycling device with improved sealing, comprising:
    a housing defining a piston chamber having at least three walls, wherein adjacent walls are spaced apart, and including cylindrical cross section, seal housings with openings mating provided between adjacent ones of the walls;
    a piston element positioned within the housing and having a cross sectional shape for mating with the housing walls, wherein the piston element includes a generally circular recessed surface at each corner;
    an inner seal element positioned within each of the recessed surfaces, the inner seal element including an elongate cylindrical body with a slot extending therethrough;
    an outer seal element positioned within each of the seal housings, the outer seal element including an elongate cylindrical body with a slot extending partially through the cylindrical body; and
    a partition positioned between each pair of the inner and outer seal elements and slidably engaged with the slots in the seal elements, whereby during operation of the device the partitions periodically pass through the elongate cylindrical bodies of the inner seal elements via the slots in the inner seal elements.

8. The device of claim 7, wherein the seal elements include a raised seal element extending parallel to the central axis of the elongate cylindrical body positioned on an outer surface of each of the seal elements.

9. The device of claim 7, wherein the partition includes an air bearing, an oil bearing, or a magnetic bearing configured such that a bearing separation distance is maintained between the partition and the inner seal element at the contact surface.

10. The device of claim 7, wherein each of the seal elements includes a ring seal around each end of the elongate cylindrical body.

* * * * *